(12) United States Patent
Chai

(10) Patent No.: US 6,564,835 B1
(45) Date of Patent: May 20, 2003

(54) METHOD OF HARVESTING TIMBER TREES IN A JUNGLE AND A MACHINE FOR PERFORMING SAID METHOD

(75) Inventor: Wong Yeon Chai, Kuala Lumpur (MY)

(73) Assignee: Green Earth Limited, Tortola (VG)

( * ) Notice: Subject to any disclaimer, the term of this patent is extended or adjusted under 35 U.S.C. 154(b) by 0 days.

(21) Appl. No.: 09/605,151

(22) Filed: Jun. 28, 2000

(30) Foreign Application Priority Data

Dec. 3, 1999 (MY) .......................................... PI 9905278
Feb. 28, 2000 (MY) .......................................... PI 2000764

(51) Int. Cl.⁷ .............................................. A01G 23/08
(52) U.S. Cl. ........................ 144/34.1; 144/4.1; 212/306
(58) Field of Search ................................... 144/4.1, 34.1, 144/34.2, 335, 336; 212/297, 299, 300, 306, 201, 203

(56) References Cited

U.S. PATENT DOCUMENTS

| | | | | |
|---|---|---|---|---|
| 3,353,575 A | * | 11/1967 | Larsen et al. | 144/34.1 |
| 3,461,929 A | * | 8/1969 | Hunger et al. | 144/34.1 |
| 3,683,979 A | * | 8/1972 | Peltola et al. | 144/34.2 |
| 3,727,653 A | * | 4/1973 | Tucek | 144/34.1 |
| 4,114,666 A | | 9/1978 | Bruun | 144/309 |
| 4,124,047 A | * | 11/1978 | Dressler et al. | 144/4.1 |
| 4,276,918 A | * | 7/1981 | Sigouin | 144/4.1 |
| 4,400,132 A | * | 8/1983 | Deline et al. | 414/569 |
| 4,531,883 A | * | 7/1985 | Arnold | 414/722 |
| 4,583,908 A | * | 4/1986 | Crawford | 414/694 |
| 4,858,700 A | * | 8/1989 | Shafer | 173/22 |
| 4,881,865 A | * | 11/1989 | Herolf | 144/4.1 |
| 5,048,172 A | * | 9/1991 | Gravenhorst | 29/401.1 |
| 5,568,829 A | * | 10/1996 | Crawford et al. | 144/34.1 |
| 6,039,194 A | * | 3/2000 | Beeche et al. | 212/301 |
| 6,213,320 B1 | * | 4/2001 | Hallstrom | 144/4.1 |

* cited by examiner

*Primary Examiner*—Ed Tolan
(74) *Attorney, Agent, or Firm*—Needle & Rosenberg, P.C.

(57) ABSTRACT

A method of harvesting standing trees in a jungle comprising bringing a crawler crane, preferably a hydraulic crawler crane, with a boom (14) to a block of jungle, securing the tree to be harvested to a sling in the boom, cutting the base of the tree, removing the cut tree using the boom, laying the cut tree on the ground, and cutting the crown of the cut tree. In another aspect the crown of the tree is cut first and removed by means of a sling on the boom of the crane. The crane is used to remove the crownless tree, or the crownless tree is cut at the base and allowed to fall. Main roads, spur roads, and snig tracks are constructed in the logging area. Alternatively, another method of harvesting cut trees in a jungle includes bringing a crawler (20) with a boom structure (26) to a block (102) of jungle, securing the harvested timber (70) to a winching cable (40) on the boom structure (26), stabilizing the crawler (20), and snigging the harvested timber (70) toward the crawler so that the harvested timber is at an inclined angle with respect to the ground. A forest harvesting machine comprising a crawler (20) with a boom structure (26), a winch, and a foldable arm structure (30) is also disclosed, having grasping claws (34) pivotally mounted along the boom structure (26), wherein during the snigging of harvested timber (70), the foldable arm structure (30) is used to stabilize the crawler (20).

17 Claims, 23 Drawing Sheets

METHOD OF HARVESTING TIMBER TREES IN A JUNGLE AND A MACHINE FOR PERFORMING SAID METHOD

FIELD OF THE INVENTION

The present invention relates to a method of harvesting timber trees in a jungle, and more particularly relates to a method of snigging or retracting fallen timber trees in a jungle, and machine used in the method to snig the harvested timber trees to a cleared site in the jungle.

BACKGROUND OF THE INVENTION

It is known in the art relating to methods of forest harvesting, and particularly the harvesting of timber trees in tropical jungles, that the jungle ground is cleared of vegetation to allow the passage of lorries and cranes. The trees selected for harvesting are cut at their base, and allowed to fall generally in a predetermined direction. The fall of the trees damages all growth, including smaller trees and young saplings on the ground. The branches of the fallen tree are then cut off, and the timber trunk is snigged, or skidded, to a cleared area of the jungle for further cutting or loading into transport vehicles. The snigging or pulling of the trees along the ground further damages the vegetation on the ground. To enable lorries and cranes to reach the fallen tree, all vegetation on the path of travel for the lorries and cranes is removed. This causes further destruction of the vegetation or jungle cover. It is not uncommon, therefore, to find entire blocks of jungle laid barren in the harvesting and transporting of timber trees in tropical jungles. The known methods of transferring timber trees in tropical jungles typically result in the destruction of more than 60% of the jungle cover, a level of destruction that is totally undesirable.

Because of the destruction of young trees, saplings, and vegetation, the jungle cannot regenerate itself within a reasonable time. Under present practice, it takes more than 100 years before the re-harvesting of new timber trees can be considered in many tropical jungle areas. U.S. Pat. No. 4,114,666 to L. O. Bruum discloses a method of forest harvesting, and a machine for performing said method. The method and machine disclosed, though useful for harvesting timber trees in temperate or cultured forests, are not suitable for harvesting larger sized and branched tropical timber trees.

Another method of harvesting timber trees in tropical countries involves the use of helicopters. Helicopters are used to cut the crown of the tree, and to lift the cut tree to a logging yard. Although this method reduces damage to jungle cover to below 10%, it is not yet cost-effective or practical to continue use in harvesting an entire jungle area because the profit margins are greatly reduced, making the method economically unattractive.

Thus, there is a need for harvesters of tropical timber in tropical jungles to comply with the criteria laid down by the Forest Stewardship Council's Principles and Criteria (P&C). More particularly, there is a need for an effective method of harvesting tropical timber trees, and to manage the manner in which the vehicles are used in snigging the cut timber trees within the logging area such that there is minimum destruction of the uncut timber trees and the undergrowth.

SUMMARY OF INVENTION

The present invention discloses a method of harvesting standing trees in a jungle that includes bringing a crawler crane with a boom to a block of jungle, securing the tree to be harvested to a sling in the boom, cutting the base of the tree, removing the cut tree using the boom, laying the cut tree on the ground, and cutting off the crown of the cut tree.

In another aspect of the invention, the method of harvesting standing trees in a jungle includes bringing a crawler crane with a boom to a block of jungle, securing the crown of a tree to be harvested to a sling in the boom, raising an operator to the crown portion of the tree, cutting the crown portion of the tree, removing the operator from the tree, removing the crown of the tree, and cutting the crownless tree at the base of the tree.

The crawler crane is preferably a hydraulic crawler crane. To enable the crawler crane to travel in the jungle, a main road is constructed across a predetermined area of the jungle, a spur road is constructed leading from the main road to a log landing area for a given sub-block of the jungle, and a plurality of snig tracks which extend radially from the log landing area are constructed in each sub-block of the jungle. In yet another aspect, a main road is constructed across a predetermined area of the jungle, and a plurality of spaced and parallel snig tracks are constructed extending from the main road, the distance between adjacent snig tracks being substantially equivalent to two to three times the length of the boom of the crane.

To attach the sling of the boom to the crown of the tree, and to cut the crown portion of a standing tree to be harvested, an operator is lifted to the crown portion of the tree in a steel cabin secured to the boom of the crane. The operator's cabin of the crawler crane is fortified by means of a metal cage. The sides of the crane boom are enveloped by metal plate sidings to avoid or reduce the likelihood of entangling foliage within the lattice of the boom where the crane is used. The boom of the crawler crane is constructed to swing 360° in a horizontal circle about the crawler, and to be raised up to 90° in the vertical axis.

Typically the area of the jungle to be harvested when the crawler crane is positioned in the jungle is a circular area covered by the length of the boom of the crane, usually, 60 meters. However this circular area of the trees to be harvested can be extended by the use of connector slings. Typically the circular area can be extended by an additional radial length of 16 meters.

Alternatively, and in another method of harvesting cut trees in a jungle, a crawler with a boom structure is brought to a predetermined block of the jungle, the harvested timber is secured to a winching cable on the boom structure, the crawler is stabilized, and the harvested timber is secured toward the crawler so that the harvested timber is moved in an inclined angle in relation to the ground. The winching cable is brought to the timber by securing it to an auxiliary winch cable of an auxiliary winch on the crawler, and retracting the auxiliary winch cable around an obstacle. The height of the boom structure is substantially more than 5 meters above ground so that the harvested timber is snigged in an inclined angle in relation to the ground to reduce obstruction and damages.

Another method of harvesting cut trees in a jungle includes constructing a main road across a predetermined area of jungle. A plurality of skid trails are then constructed leading from the main road, where the distance between adjacent skid trails is in the range of 200 to 300 meters.

A forest harvesting machine for practicing the above-described methods comprises a crawler with a boom structure, a winch assembly, and a foldable arm structure with grasping claws pivotally mounted along the boom structure. The foldable arm structure is used to stabilize the crawler during the snigging of harvested timber, and is operated by a hydraulic system. The crawler is stabilized on the ground by the foldable arm structure. A timber may be held on the ground by the grasping claws of the foldable arm structure for stabilizing the crawler. The crawler further includes an auxiliary winch assembly.

In another embodiment, the crawler has a boom structure mounted pivotally to a backhoe arm. A claw is secured to one end of the boom structure, and a roller guide assembly is secured to the other end of the boom structure. The crawler further includes an auxiliary winch assembly.

Further advantages and characteristics of the invention are given below in the description of the method of jungle harvesting of timber trees in a tropical jungle. Also described are the layout pattern of tracks, and an, apparatus used in relation thereto, with reference to the accompanying drawings.

DETAILED DESCRIPTION OF THE INVENTION

Before commencing the harvesting operation, a pre-harvest inventory is conducted appropriate to the scale of the planned block using predetermined strip lines to gather the species composition, identification of trees to be cut, diameter, classification, and height of merchantable trees, and to forecast the yield per hectare. The trees to be harvested are marked at the same time. The tree marking is important and necessary in order to guide the chainsaw operators to those trees to be cut, and to indicate an arrow pointing in the direction of the fall for the respective trees to ensure and minimize damage to residual trees and young saplings during extraction of the cut trees.

Figure 1:
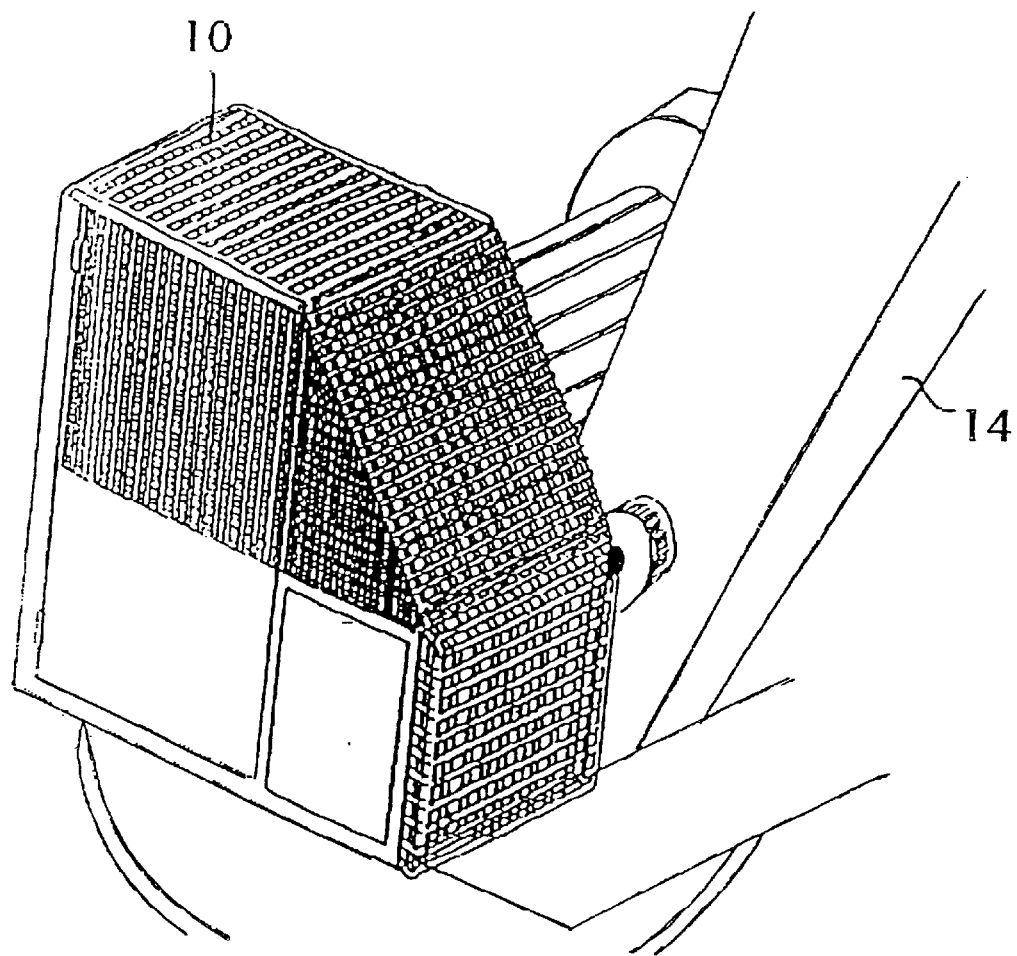
FIG. 1 shows a crane operator's cabin shield.

According to a first embodiment of the invention, a hydraulic crawler crane, for example a model 1H1-CCH1000 crane, with a lifting capacity of substantially 100 metric tons is used for the purposes of lifting, skidding, and yarding of the timber, or cut trees. The terms "skidding" and "snigging" are used interchangeably, it being known to those of skill in the art that these terms describe the dragging or movement of harvested timber across a surface for the purpose of collecting cut trees. The boom of the crane in the preferred embodiment is at least 60 meters or 197 feet in length, and is capable of swinging in both the vertical and horizontal planes. The operator's cabin is fortified. A metallic web 10 is enclosed around the operator's control station in the crane (FIG. 1).

Figure 2:
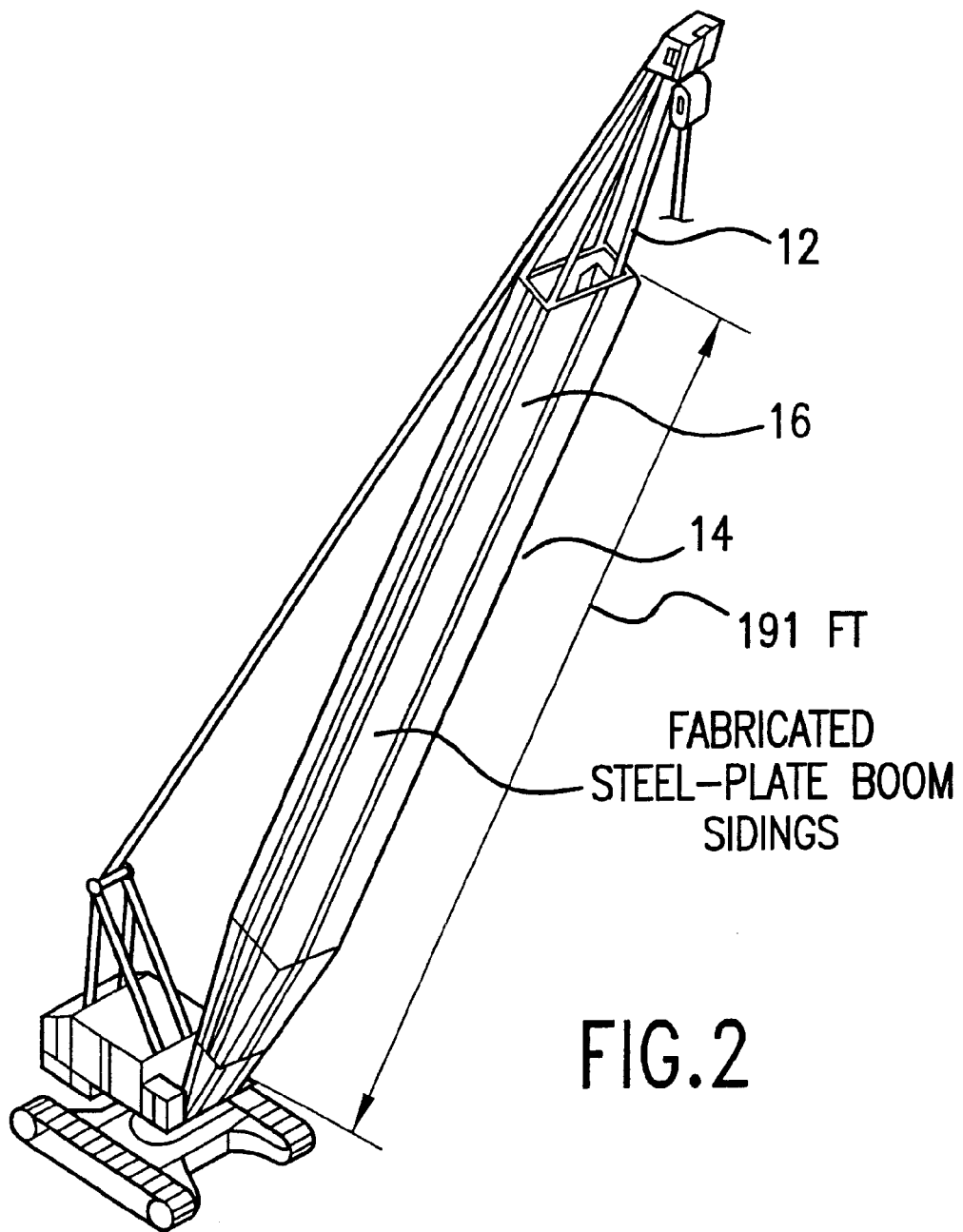
FIG. 2 shows a first embodiment of a crane with steel plate sidings on the boom of the crane.
Figure 3:
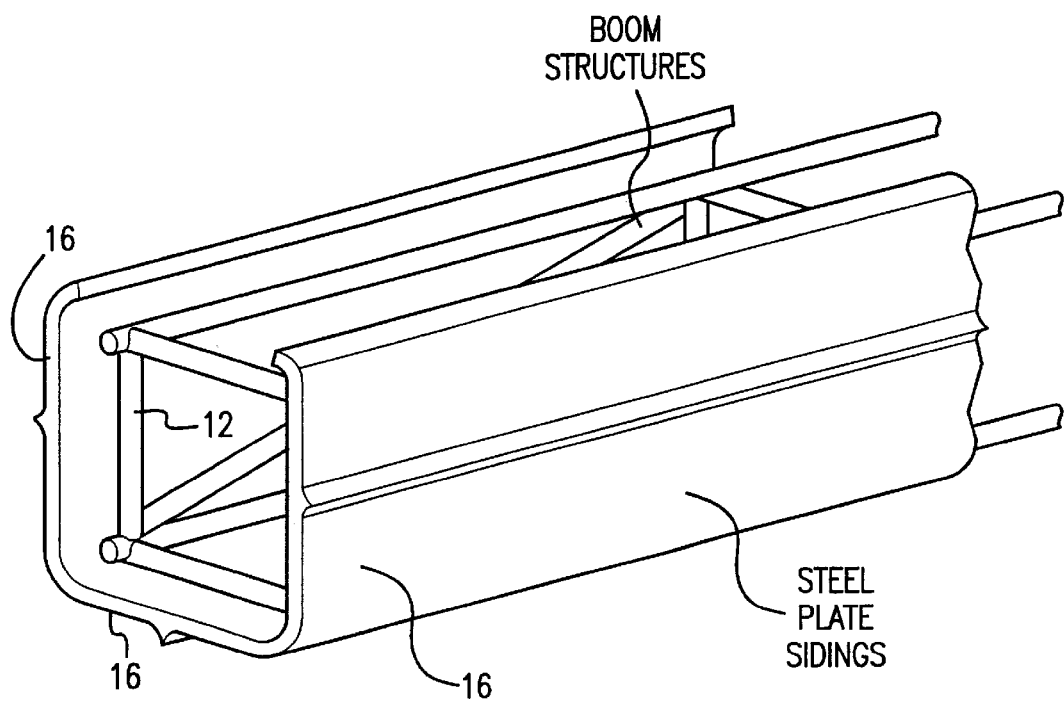
FIG. 3 is an isometric view of the steel plate sidings of the boom of the crane of FIG. 2.
Figure 4:
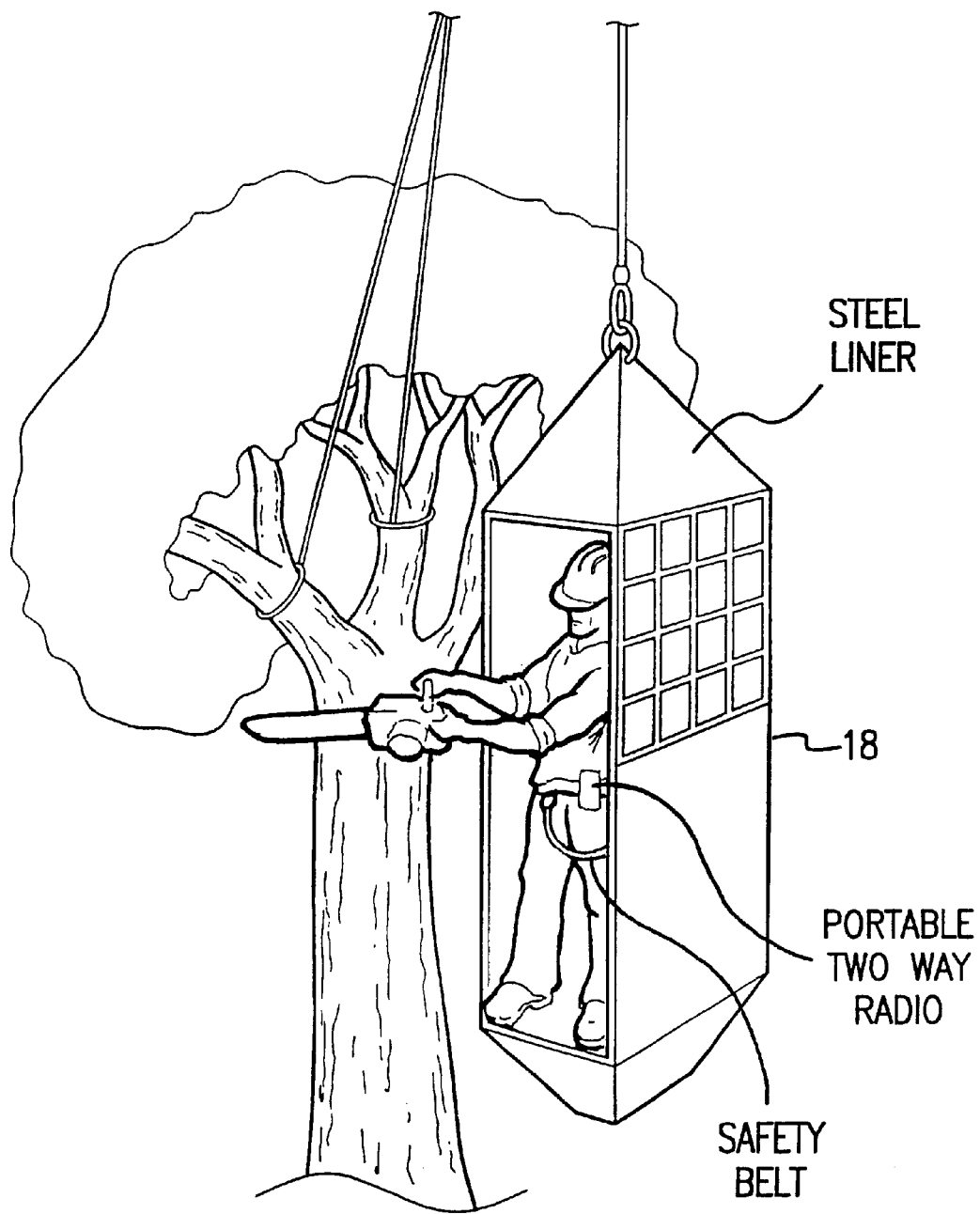
FIG. 4 shows a worker pruning the crown of a timber tree to be harvested.

In order to prevent the branches of the crown of the tree,n and other vegetation from getting entangled in the steel frame lattice 12 of the boom 14, the boom of the crane is enveloped using a desired number of steel plate sidings 16 (FIGS. 2 and 3). Other rigid plates can also be used for the sidings. To enable an operator to cut the crown of the tree to be harvested, a steel cabin enclosure 18 is provided (FIG. 4). The steel cabin enclosure 18 is designed to accommodate at least one person, and to be lifted to the crown region of the tree by the boom of the crane.

Further, in order to allow the travel of the crawler crane in the swampy or soft ground of the jungle, suitable crane track slippers are provided. These crane track slippers are preferably constructed of hardwood timber slabs tied together to form a planar slab assembly, or assemblies, as needed. The slab assemblies are reused as track construction progresses. In the known methods of constructing tracks for lorries, young trees are often cut and laid on the ground to form a firm foundation for the lorries to travel. This cutting of young trees to construct the track further destroys the jungle vegetation, which is an undesirable practice.

The hydraulic crawler crane can be used to skid or snig cut timber trees. However, it is necessary to stabilize the crawler crane before snigging the timber tree. This is done by securing a stabilizer member to the boom 14 of the crane, or adopting other methods known in the art such as the provision of a backhoe (not illustrated) on the crane. Where the boom 14 is constructed as a steel frame lattice, the crawler crane may not be strong enough to snig heavy timber trees. However, the crawler crane can be used to snig timber trees which are of smaller size or which are light. Thus the hydraulic crawler crane can also be used to snig cut timber trees provided the crawler is stabilized using a stabilizer member (not illustrated), and the weight of the timber to be snigged is within the safety limit of the steel lattice structure framework of the boom 14.

Figure 5:
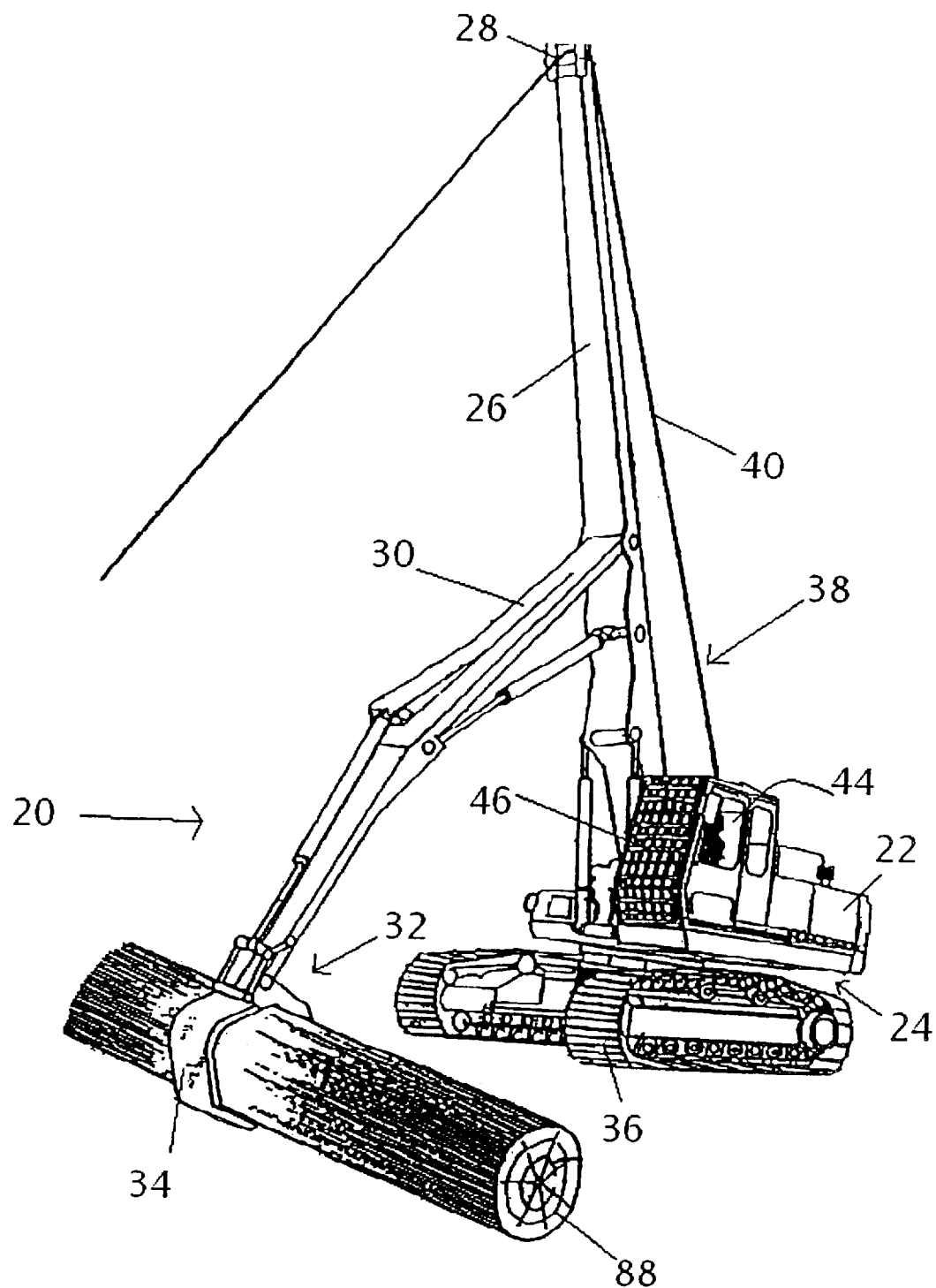
FIG. 5 is a perspective view of a second embodiment of a machine used to snig the cut timber trees.

In a second embodiment, the general construction of a crawler 20 is shown in FIG. 5. The crawler 20 includes a revolving upper structure 22 rotatably mounted on an undercarriage 24. The revolving upper structure 22 has a front end from which a boom structure 26 is connected. The boom structure 26 is pivotally moveable in a vertical plane with the help of hydraulic cylinders. A roller guide 28 is provided at the top end of the boom structure 26 for winching purposes. (FIG. 5)

The crawler also includes a foldable arm structure 30, i.e., a backhoe arm (FIG. 5). The rear end of the foldable arm structure 30 is pivotally connected to the boom structure 26 and includes a hydraulic cylinder to rotatably move the arm structure 30. The other end of the arm structure 30 is connected to a gripper 32. The gripper 32 includes a pair of claws 34, which are swingable toward and away from each other. The claws 34 are operated with the help of hydraulic cylinders mounted on the arm structure 30. The height of the boom structure 26 of the crawler 20 should be substantially greater than five meters. In the preferred embodiment, the height of the boom structure is substantially 14 meters, or 46 feet, from the track shoe 36 to the top end of the boom structure 26, whereas the arm structure 30 is preferably about 6.5 meters long. The boom structure 26 can also be an extendable type, whereby the extension is executed by a suitable hydraulic system (not illustrated).

Figure 6:
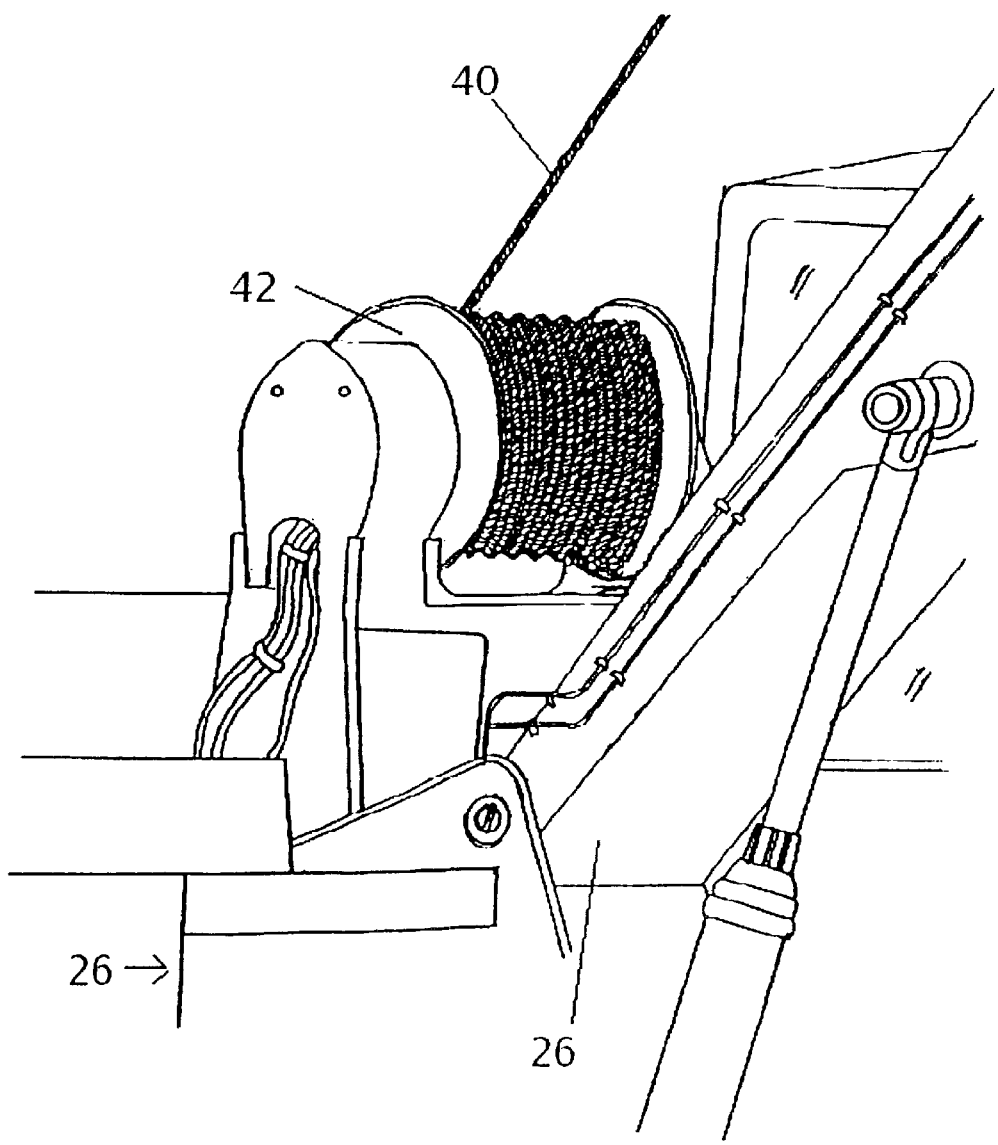
FIG. 6 shows the detail of the winch assembly to which cables are secured to the boom.

The crawler 20 is provided with a main winch assembly 38. The winch assembly 38 comprises, in a preferred embodiment, a 122 meters, or 400 foot, long winching cable 40. The winching cable 40 is preferably 2.5 cm, or 1 inch, in diameter, and is rolled on a roller 42 which is mounted on the revolving upper structure 22 shown in FIG. 6.

A cabin 44, from which an operator operates the crawler is placed on the revolving upper structure 22. The cabin 44 also contains various controls to operate the crawler 20 efficiently. A portion of the cabin 44 is covered with reinforced steel bars 46 for safety purposes (FIGS. 5, 7).

Figure 7:
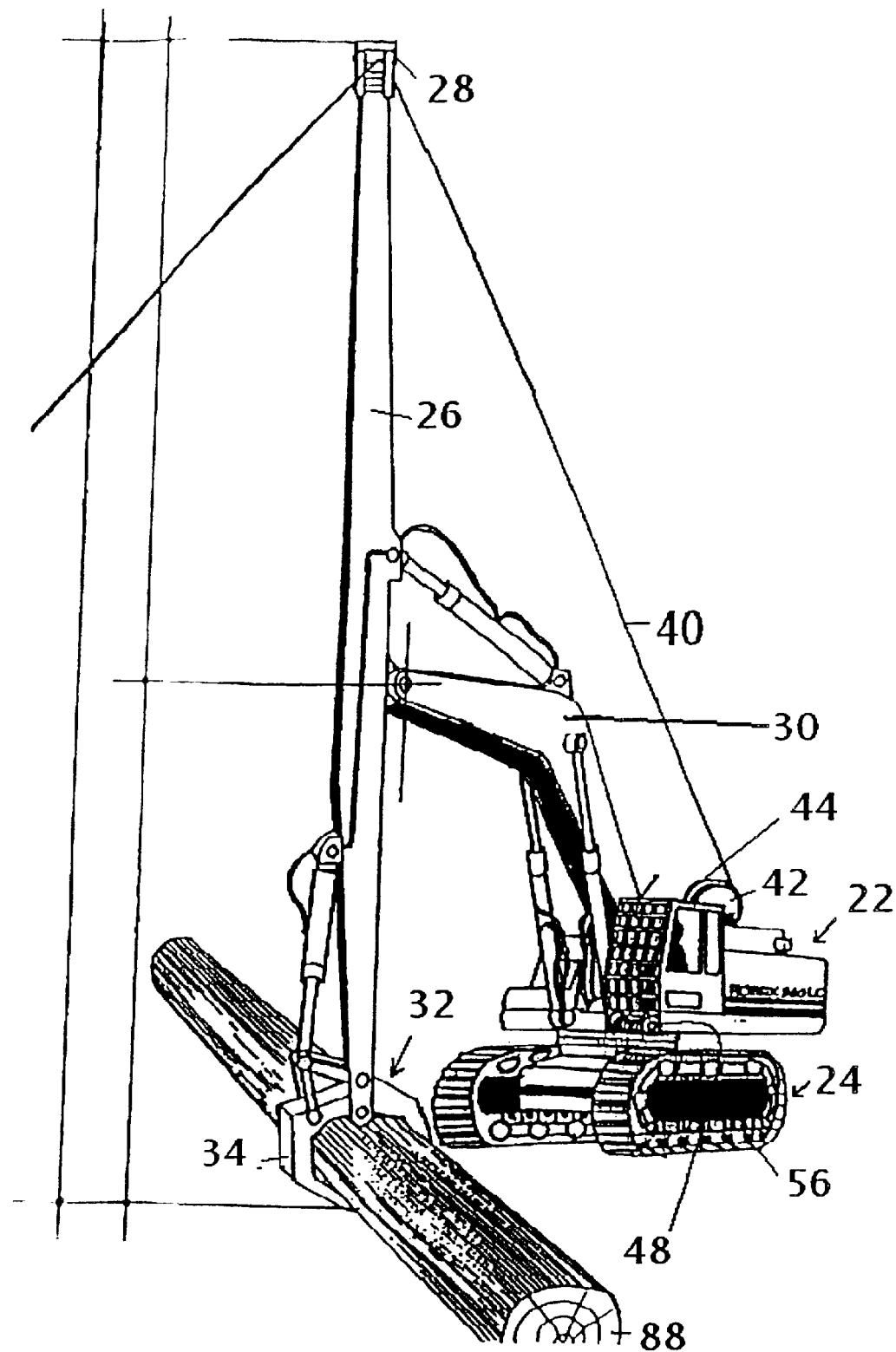
FIG. 7 is a perspective view of a third embodiment of a machine used to snig cut timber trees.
Figure 8:
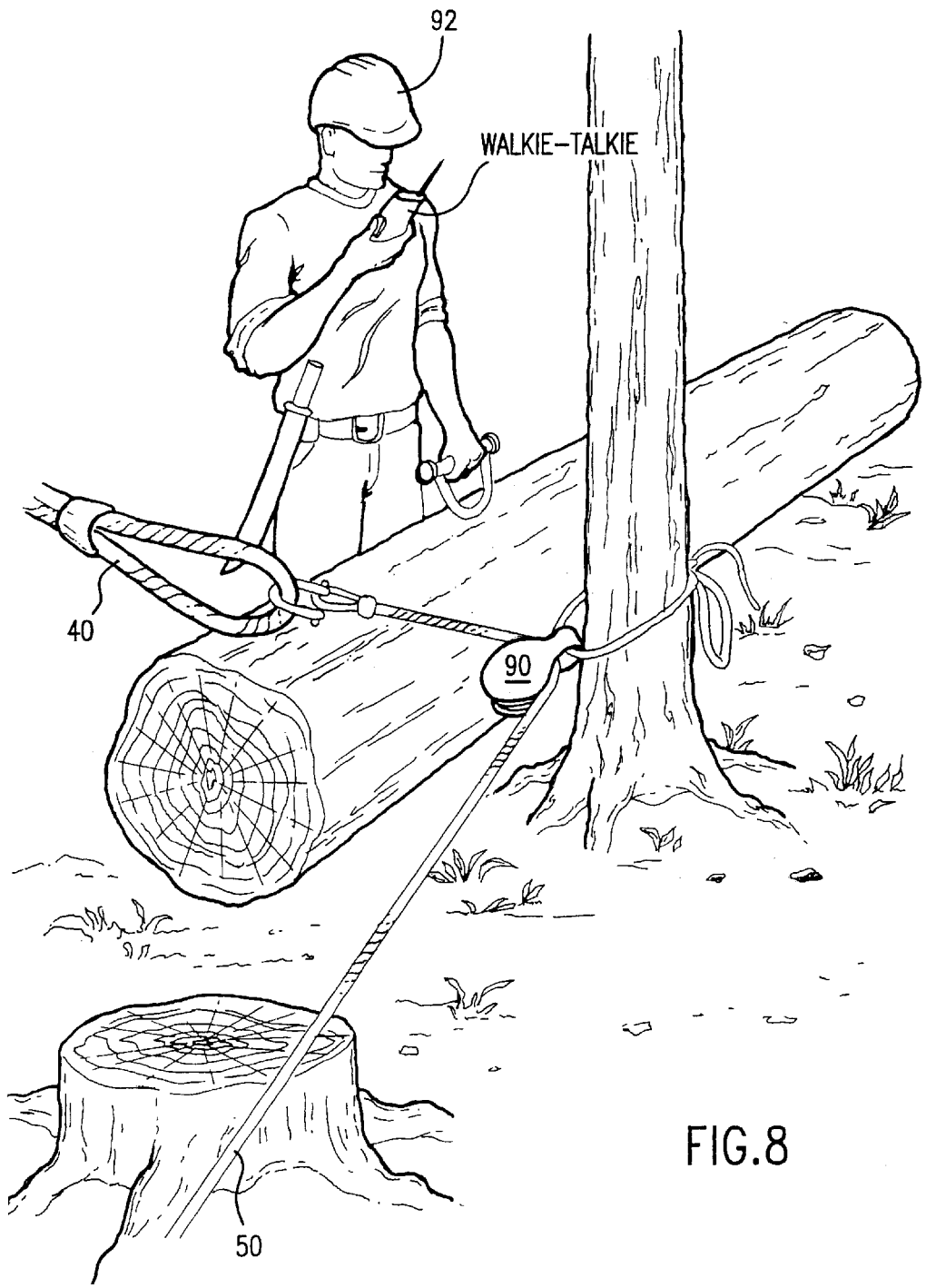
FIG. 8 shows the pull out and haul back of the main winch cable.

An auxiliary winch 48 is also provided as a part of the crawler 20 (FIG. 7). The auxiliary winch 48 includes an auxiliary winch cable 50, which is of smaller diameter compared to the winching cable 40. As the weight of the winching cable 40 is relatively large, the auxiliary winch cable 50 is used to pull the winching cable 40 out to the desired felled tree (FIG. 8).

In a third embodiment, the crawler 20 can also be constructed in such a way that the boom structure 26 is pivotally joined to an existing arm structure of a backhoe 30, as shown in FIG. 7. In this case, a gripper 32 is attached to one end of the boom structure 26, whereas the other end is provided with a roller guide 28 used for winching purposes. However, the working mechanism for this embodiment is the same as the second described embodiment.

In a fourth embodiment (not illustrated), the crawler 20 can also be constructed in such a manner that an independent boom structure is pivotally mounted on an existing undercarriage 24 of the crawler. The arm structure 30 of the crawler is still used as a stabilizer. A gripper 32 is attached to one end of the arm structure 30, and a roller guide 28 is provided at the terminal end portion of the boom structure 26. In other words there will be two, separate independent structures mounted on the crawler 20.

Figure 9:
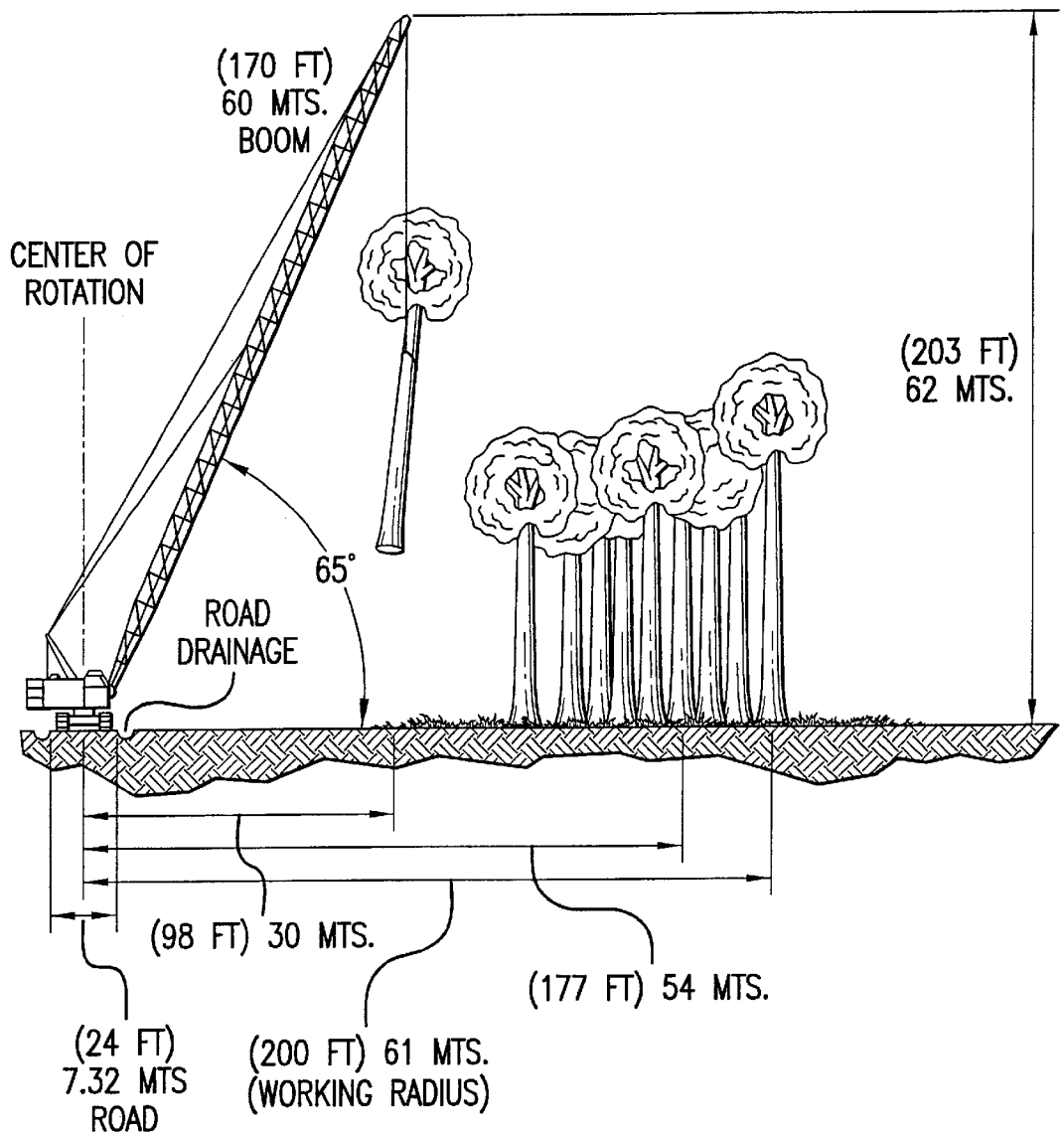
FIG. 9 is an illustration of a crane lifting a cut tree.
Figure 10:
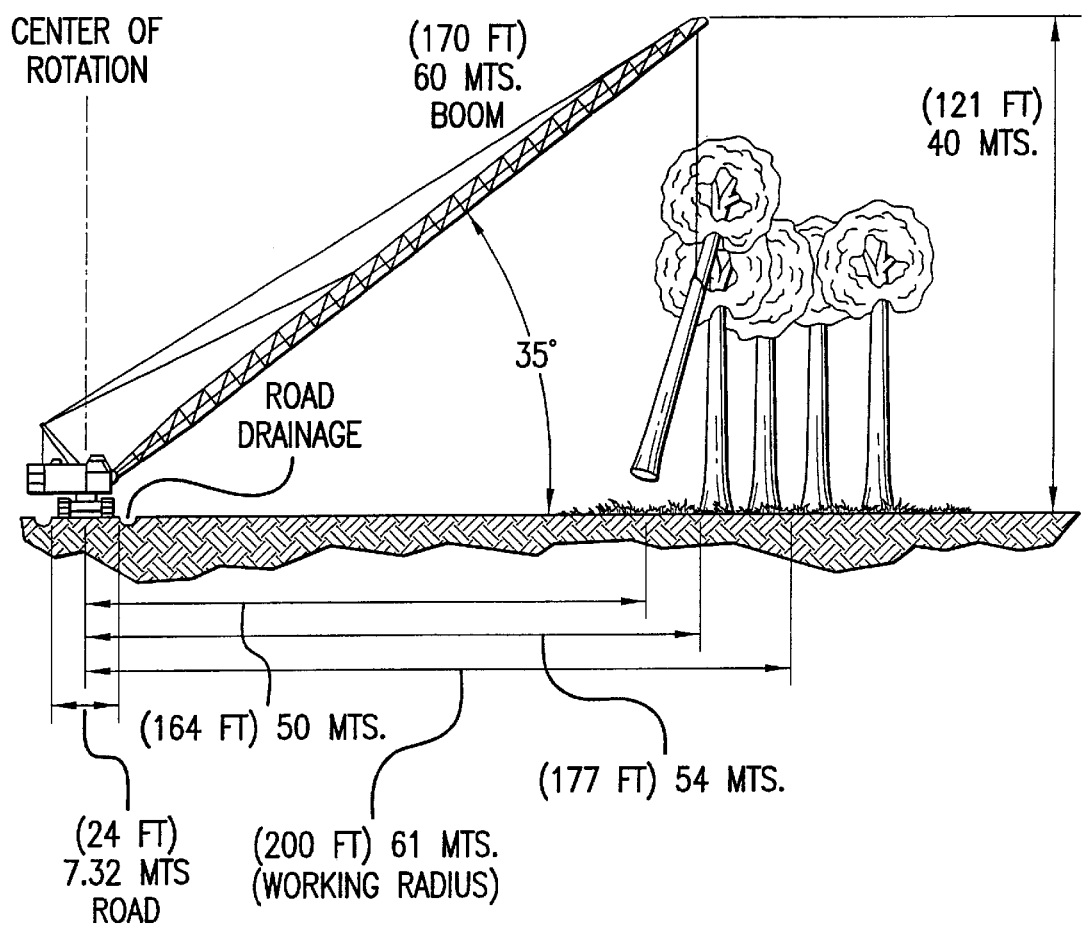
FIG. 10 is another illustration of a crane lifting a cut tree.

Referring now to the first embodiment, a hydraulic crawler crane with a designed load capacity of substantially 100 metric tons and with boom length of 60 meters is used. For a given sub-block of jungle to be harvested, a logging road 56 and a spur road or roads 58 are constructed in stages as the logging progresses deeper into the jungle. Trees and vegetation along the path of the proposed logging road are removed using the method of harvesting trees to be described herein. Other vegetation along the proposed logging road is removed using conventional methods but ensuring areas beyond the boundaries of the logging road are not damaged. The hydraulic crawler crane now enters the logging road 20. A crane hook 60 is secured to the tree to be cut, preferably at the crown region of the tree by an operator who is hoisted to the crown of the tree by the crane. The operator is accommodated within a protective cabin. A chainsaw operator then will cut the tree at the root region. After the tree is cut, the crane will lift the cut tree together with the uncut crown and deposit the tree at the log landing area (FIGS. 9 and 10). At the log-landing area, an operator will remove the unwanted foliage and branches of the cut tree. He will also cut the timber to the desired length(s). This process is repeated all over the area covered by the boom of the crane, with a radial working radius/length of substantially 61 meters.

As shown in FIG. 4, in another aspect of the invention, before falling the timber trees to be harvested, the crowns of the tree are cut. The chainsaw operator is lifted to the crown region of the tree by the crane in a steel cabin 18. Rigging cables 62 are secured to the branches at the crown of the tree. The crown is cut at its basal portion and is thereafter lifted by the boom of the crane and deposited at a clear area where the branches are further pruned. The purpose of cutting the tree crowns on standing trees is an important factor to reduce damage on residual trees and young regeneration foliage. Moreover, with this method the maximum load to be carried by the crane is also reduced by the harvesting of the tree in two stages: the first stage involving the removal of the crown of the tree, and the second stage involving the removal of the trunk of the tree.

Figure 11:
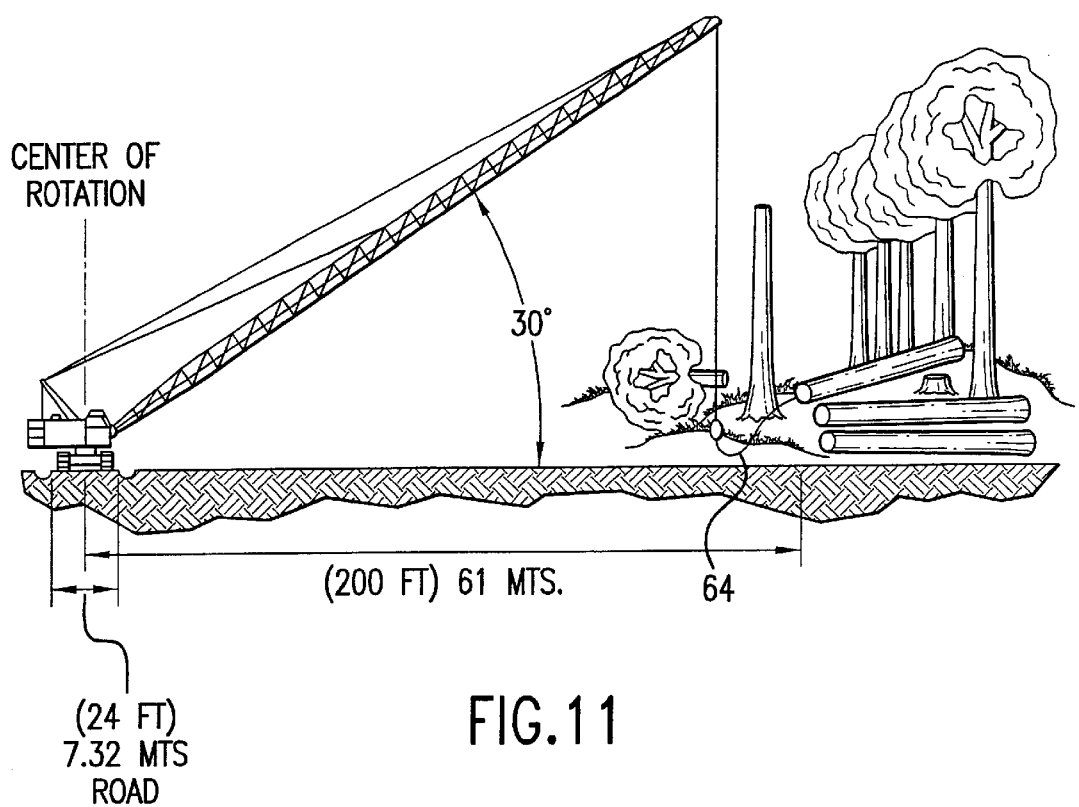
FIG. 11 is an illustration of a crane skidding a cut timber trunk.
Figure 12:
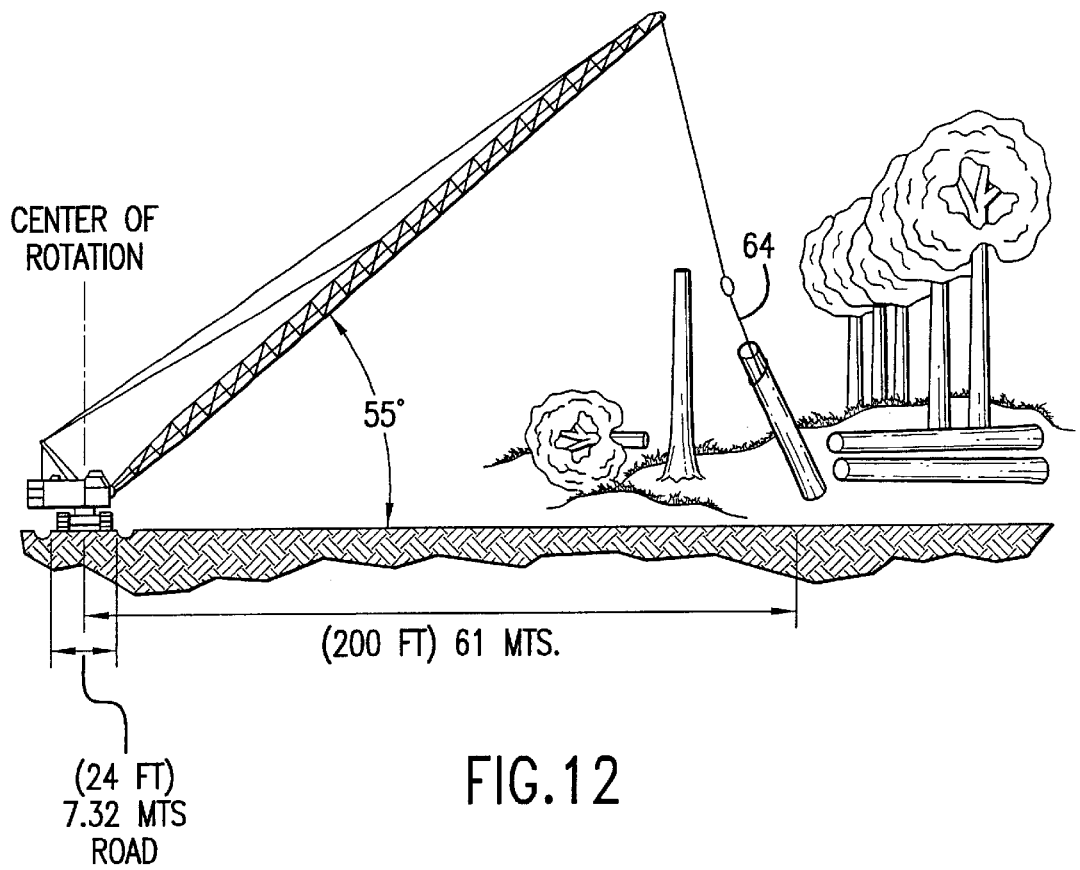
FIG. 12 is an illustration of a crane lifting a cut timber trunk.

In another aspect of the invention, a connector sling cable, or cables, 64 are used to secure the crown or the trunk of a cut tree to the pre-existing sling cable of the boom of the crane. By the use of the connector sling cable(s) 64, the working radius of the crane can be further extended (FIGS. 11 and 12). At areas beyond the radius of 61 meters from the position of the crawler crane, the trees are felled by cutting the tree at the base of the tree and allowing the tree to fall in an already harvested area of the jungle. Then slings are secured to the fallen tree which is then snigged to the log-landing area by the crawler crane.

In the second, third, and fourth embodiments described herein, a reason for using the winch assembly 38 is to restrict the movement of the crawler 20 from going inside the demarcated logging area. The crawler 20 will remain only on the main road 66 and skid trails 68, and snig the timber 70 out using the winch assembly 38. This is to reduce the percentage of forest area from being destroyed during harvesting.

Figure 13:
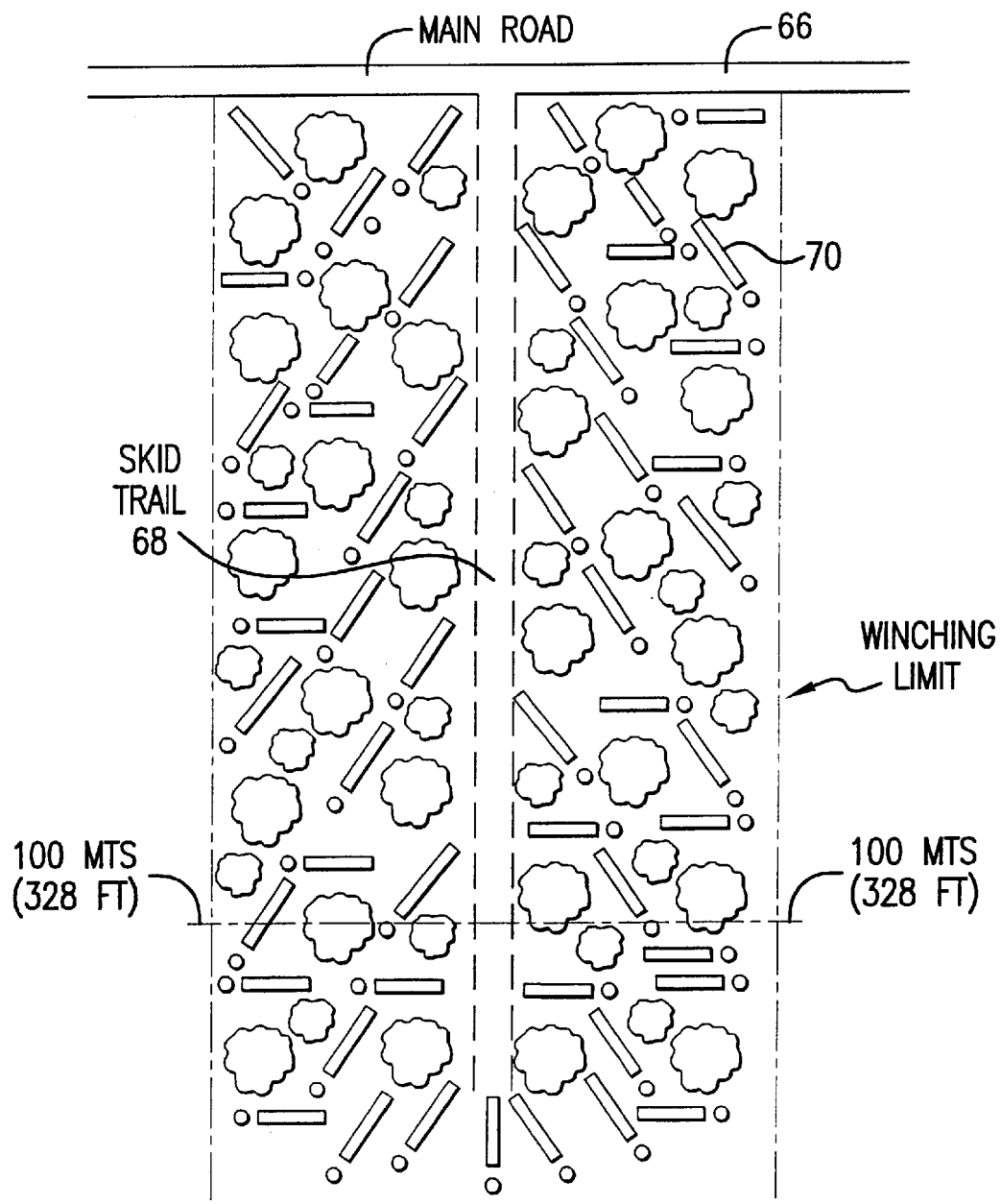
FIG. 13 is a schematic plan view of a harvested area where the timber trees are felled in a herringbone pattern.
Figure 14:
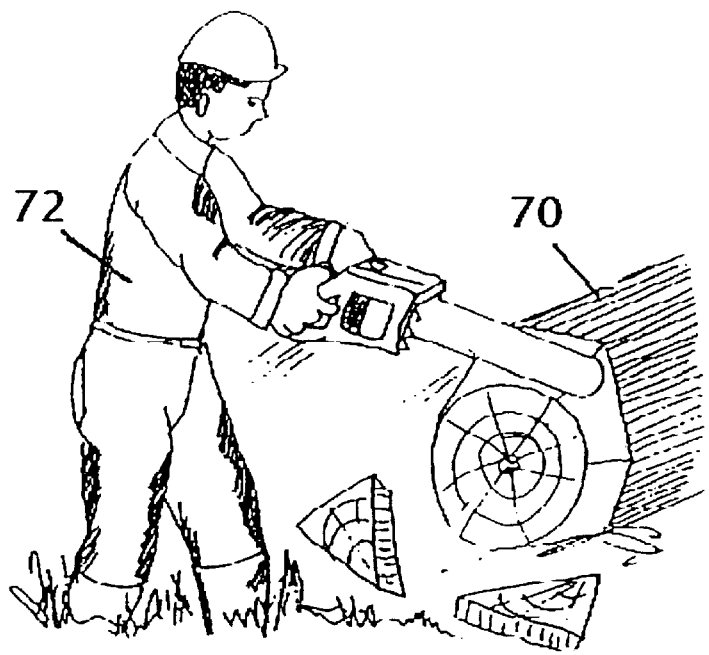
FIG. 14 shows the forward end of a cut timber tree being cut into a frustocone.
Figure 15:
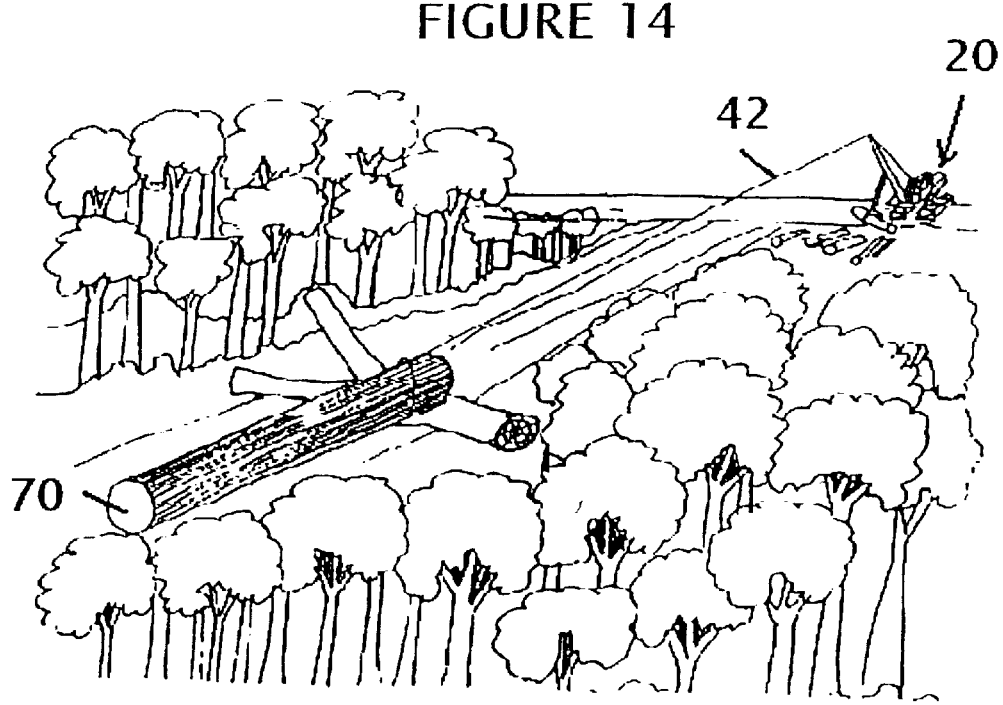
FIG. 15 shows a manner in which a cut timber tree may be moved in which the cut tree is inclined in order to go over obstacles along the path of travel.

The method of snigging cut timber trees using the crawler 20 in the second, third, and fourth embodiments is now described. A tree feller 72, a chainsaw operator, will be trained for the directional felling of timber 70. This will be done by aligning the pattern and the sequence of the cutting of the tree(s) 70 in a "herringbone" pattern to the skid trails 68 and avoiding the need for an excavator to align the cut timber 70 tree on the ground before winching (FIG. 13). This practice allows efficient and minimum impact during the process of winching the timber 70 from the felled area to the skid trails 68. After harvesting the trees, the tree feller 72 will cut the timber head or timber end to form a cone or frusto-cone (FIG. 14). This is to allow the timber 70 to be winched smoothly to reduce friction during the winching operation (FIG. 15).

Figure 16:
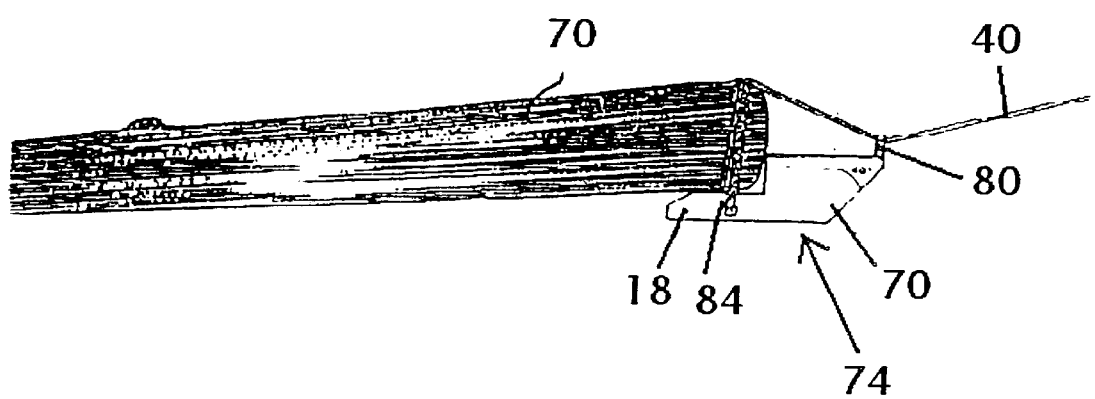
FIG. 16 shows a timber tree being conveyed on a fabricated steel sledge.
Figure 17:
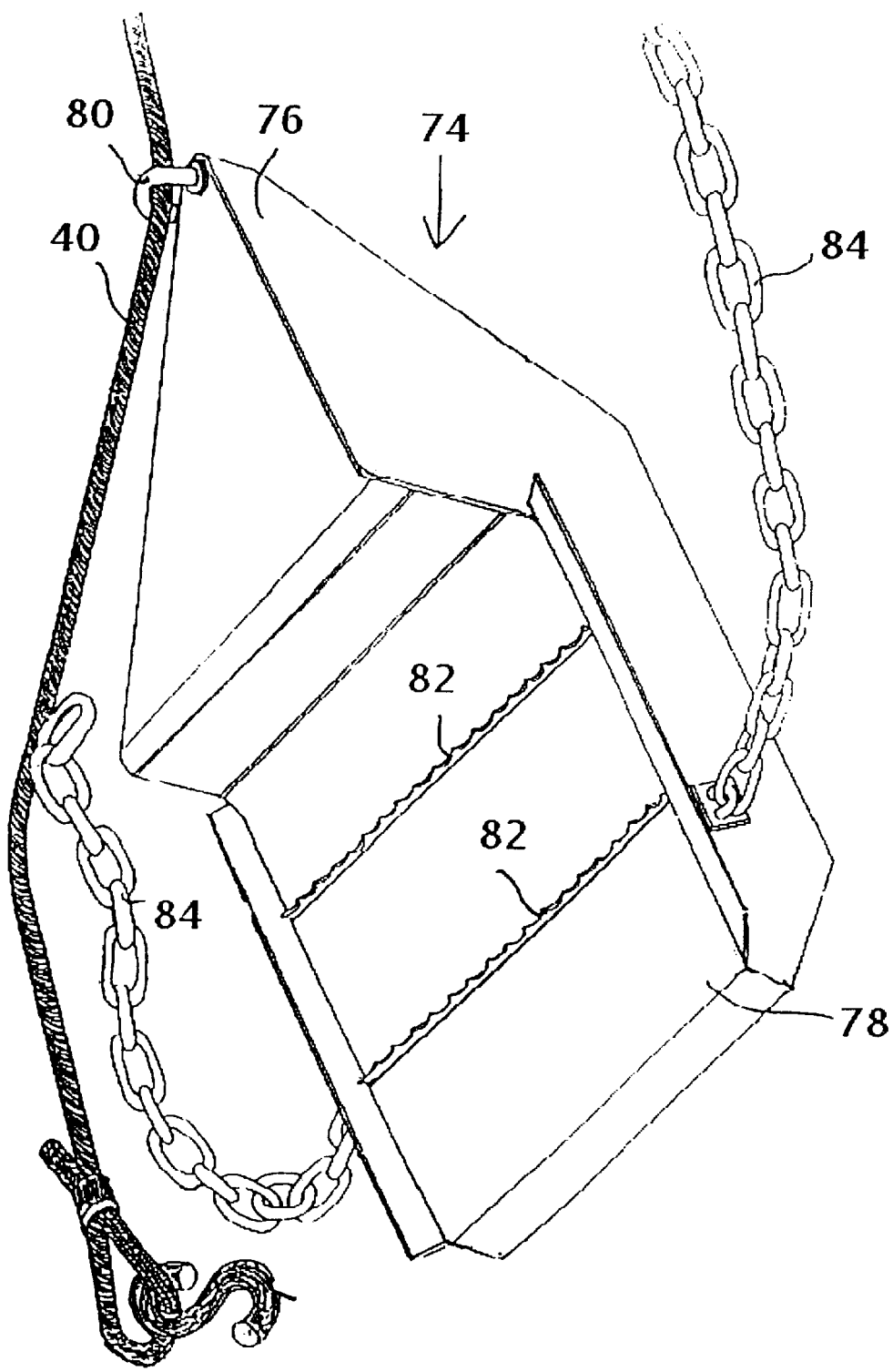
FIG. 17 is a perspective view of the sledge of FIG. 16.

A sledge 74 can also be used to convey the timber 70 during the winching process (FIG. 16). The sledge 74 has a bow portion 76 and a base portion 78. A substantially "C"-shaped hook 80 is provided at the terminal end portion of the bow portion 76. The C-shaped hook functions as a guide so that the sledge 74 moves in the direction of the winching cable 40 (FIG. 17). The base portion 78 is preferably curved like the base of a boat, and includes a plurality of projecting spikes 82. The spikes grip the timber and prevent it from sliding backwards off of the base portion 78 during the winching process (FIG. 17). A sling chain 84 is also provided on the base portion 76 to further secure the timber 70 on the sledge 74. The sledge 74 is preferably boat shaped in cross-section. At the terminal end of the winching cable 40, a substantially "S"-shaped hook 86 is provided (FIG. 17). The function of the S-shaped hook 86 will be described later.

Before winching the timber 70, another timber 88, which has already been harvested earlier, is used as a stabilizer. The stabilizing timber 88 is gripped between the claws 34 of the gripper 32 and placed horizontally on the ground as shown in FIG. 5. As mentioned earlier, the crawler 20 includes the auxiliary winch 48, which is used to pull out the winching cable 40 to a point near the harvested timber 70. The winching cable 40 is pulled out by using the auxiliary winch cable 50 and a pulley 90, which is tied around a tree near the timber 70 (FIG. 10). After rigging the timber 70, which is to be winched out, a rigger 92 will communicate with the operator of the modified hydraulic excavator to start pulling/winching the timber 70 away from the cutting area.

Figure 18:
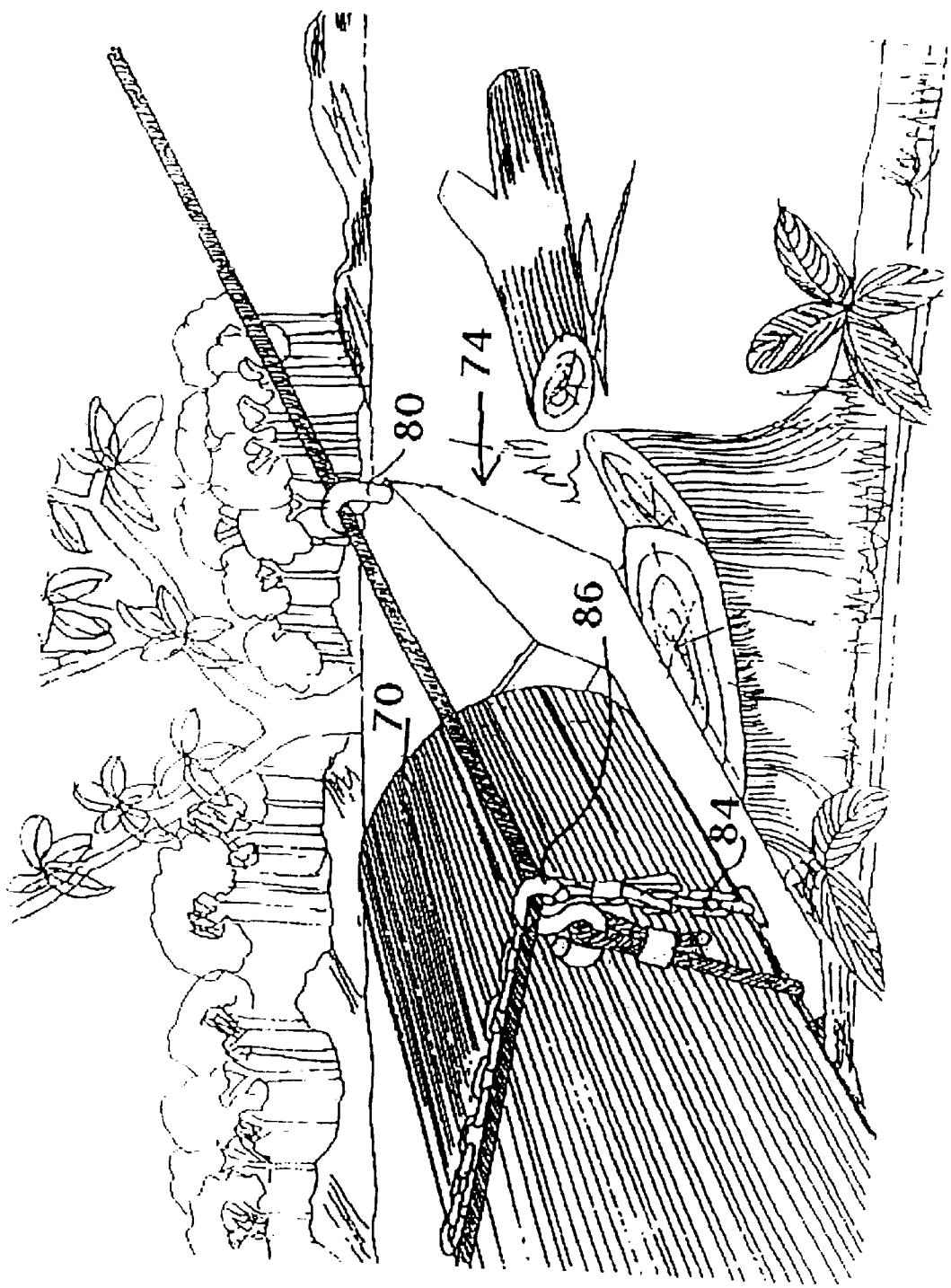
FIG. 18 shows a manner in which a cut timber tree may be moved on a sledge in which the tree is inclined in order to go over obstacles along the travel path.
Figure 19:
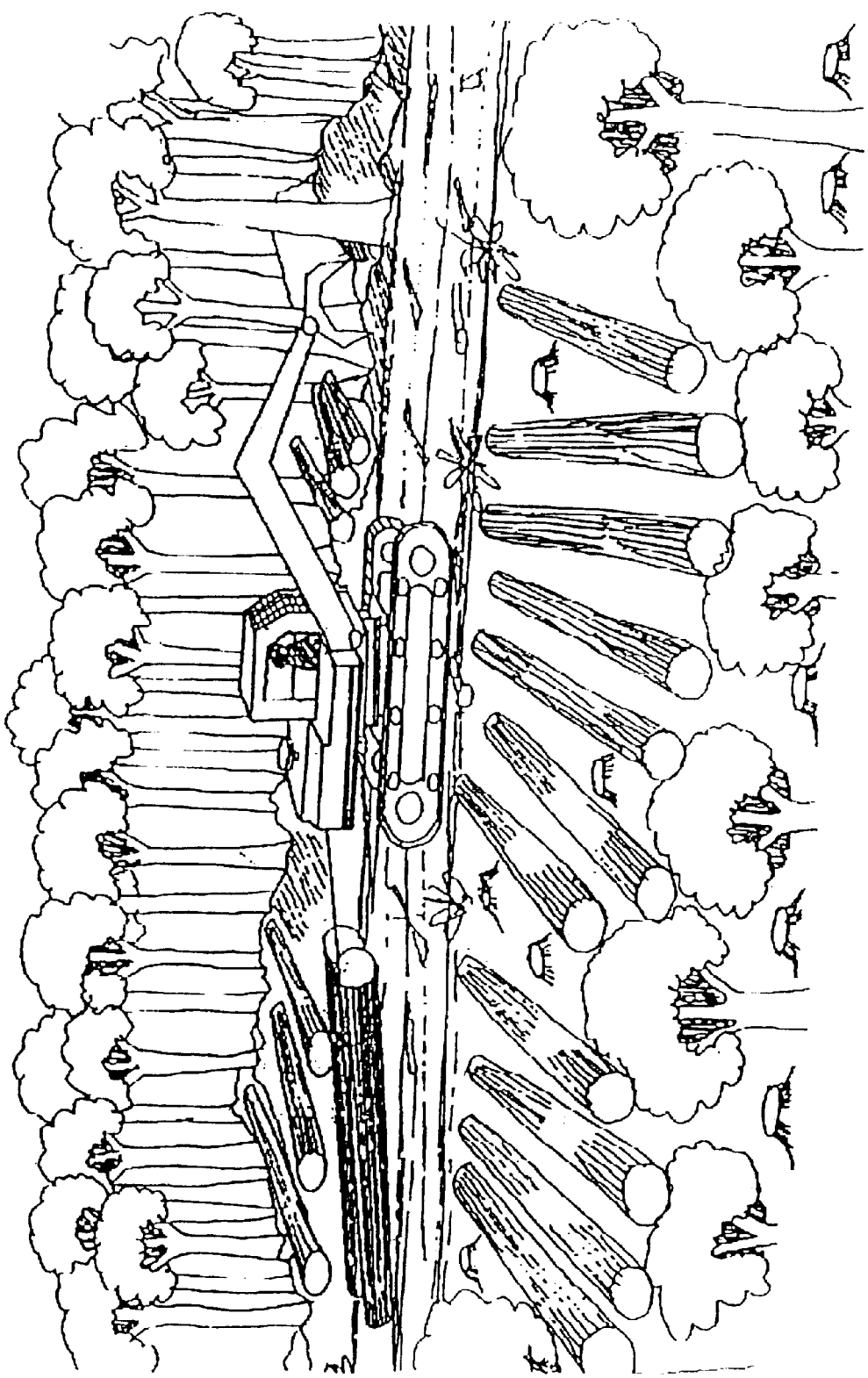
FIG. 19 shows logs being skidded along skid tracks using a hydraulic excavator.

When the steel sledge 74 is used, the timber 70 is placed on the base portion, 78 of the sledge 74. The projecting steel spikes 82 will grip the timber 70 when it is laid on the sledge. The sling chain 84 is then securely tied around the timber 70 by means of bolt and nut or by any other means known to the art. Thereafter, the winching cable 40 is also tied around the timber 70 by using the S-shaped hook 86 shown in FIG. 18. When the winching cable 40 is retracted, the grip around the timber 70 will increase. This will further secure the timber 70 in its position on the sledge 74.

The winch cable 40 is rigged to the harvested timber 70 in a manner such that the harvested timber is held at an inclined angle with respect to the ground. This enables the harvested timber being snigged to be moved over any obstacles lying along the path of travel (FIG. 7). This method also reduces the damage to the ground when the harvested tree is pulled along the ground.

All winched timber 70 will be stacked at both sides of the skid trails 68. Thereafter, another excavator, for example a PC-100 model excavator, will skid the timber 70 out to a main road 66 (FIG. 12). In the second, third, and fourth embodiments, the arm structure 20 is used to stabilize the modified hydraulic excavator 10. However, it is also possible that the arm structure 20 can be used to lift and load the timber 48 onto a truck.

In the harvesting of timber in hilly or mountainous areas, roads are first constructed in alignment with the terrain of the jungle. The roads are constructed using hydraulic excavators on the top ridges and the side ridges in these hilly forest areas. The road will have a maximum width of 7.32 meters to accommodate hydraulic crawler cranes and logging trucks during the logging operation. Hydraulic excavators are preferred as compared to the use of hydraulic tractors because the use of hydraulic tractors causes heavy damage to the forest cover. In the known methods of road construction in the jungle, bulldozers or tractors are used. Excavation and road formation by the use of tractors or bulldozers results in a great deal of excess earth, which has to be disposed or cleared from the site of the would-be road. This excess earth is just pushed down the slopes. The bulldozer cannot be used to compact the excess earth. The disposal of the excess earth onto the slopes results in serious soil erosion, particularly in enveloping the young regeneration foliage and in heavy damage to the residual trees.

Figure 20:
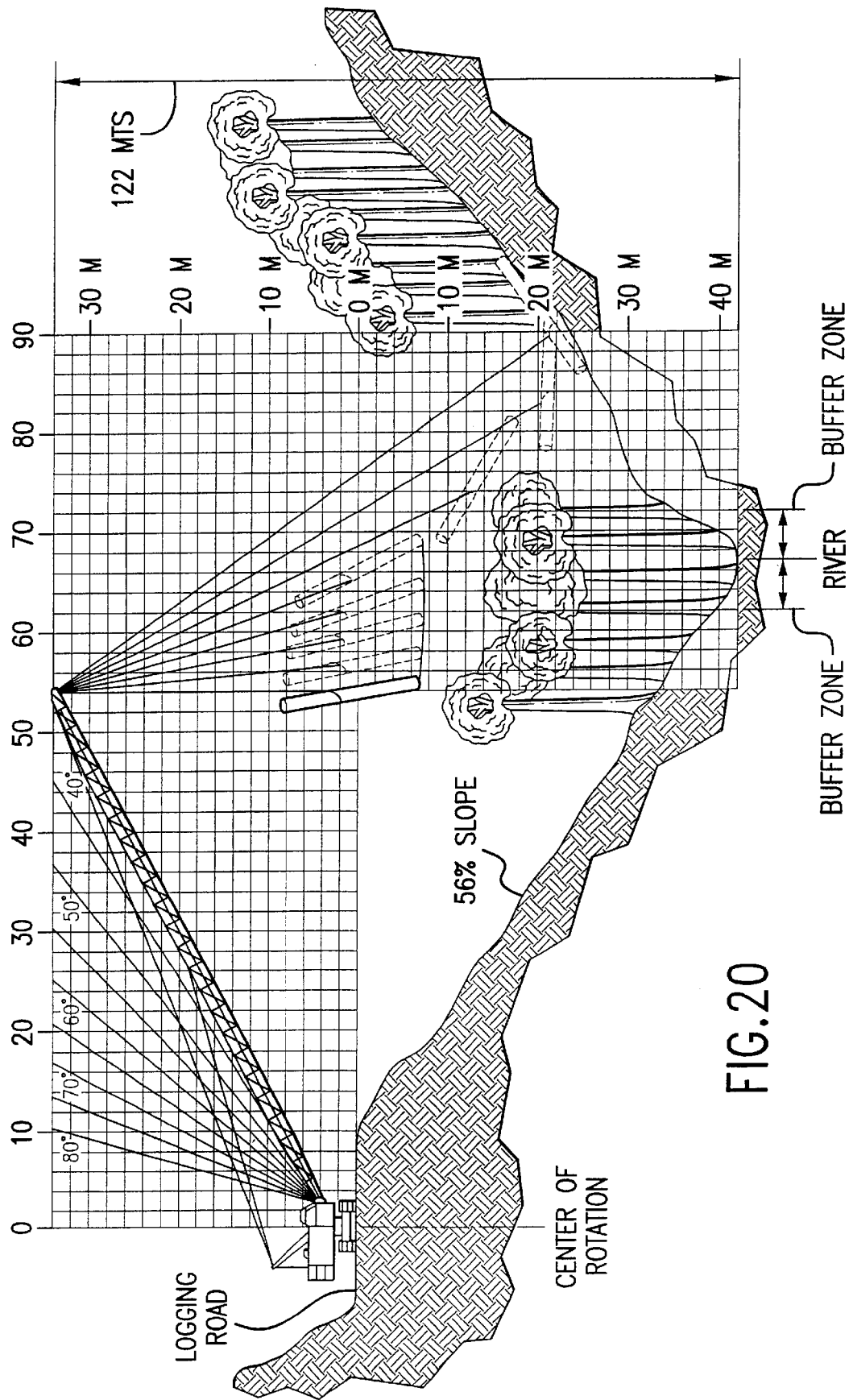
FIG. 20 is a side view of a crane operating in a mountainous or hilly forest.

By using a crawler excavator the excess earth is constructed into embankments or earth bunds, formed to be 1.5 meter wide by 1.0 meter high, on the edge of the road or carriageway. The embankments or bunds are compactable and may be tamped using the bottom side of the excavator's bucket. Very little of the carriageway or the compacted bund is washed away during heavy rainfall. Heavy compaction is also reduced by the use of hydraulic crawler crane excavators. A hydraulic crawler crane with a skidding distance in the range of 91 meters to 122 meters, 300 feet to 400 feet, from the center of rotation is used. The activity of log lifting is properly planned based on the laws of physics where the maximum load capacity is a function of the working radius of the boom. Normally the maximum working radius is up to 61 meters, 200 feet, to be within its maximum design lifting loads. However, it is possible to skid logs from a 122 meters, 400 feet, working radius before lifting (FIG. 20). Where necessary, connector sling cables are used to lift the cut logs. Bigger capacity crawler cranes can be used to harvest timber of heavier weights. In hilly forests, the area of each sub block is 15 acres.

Figure 21:
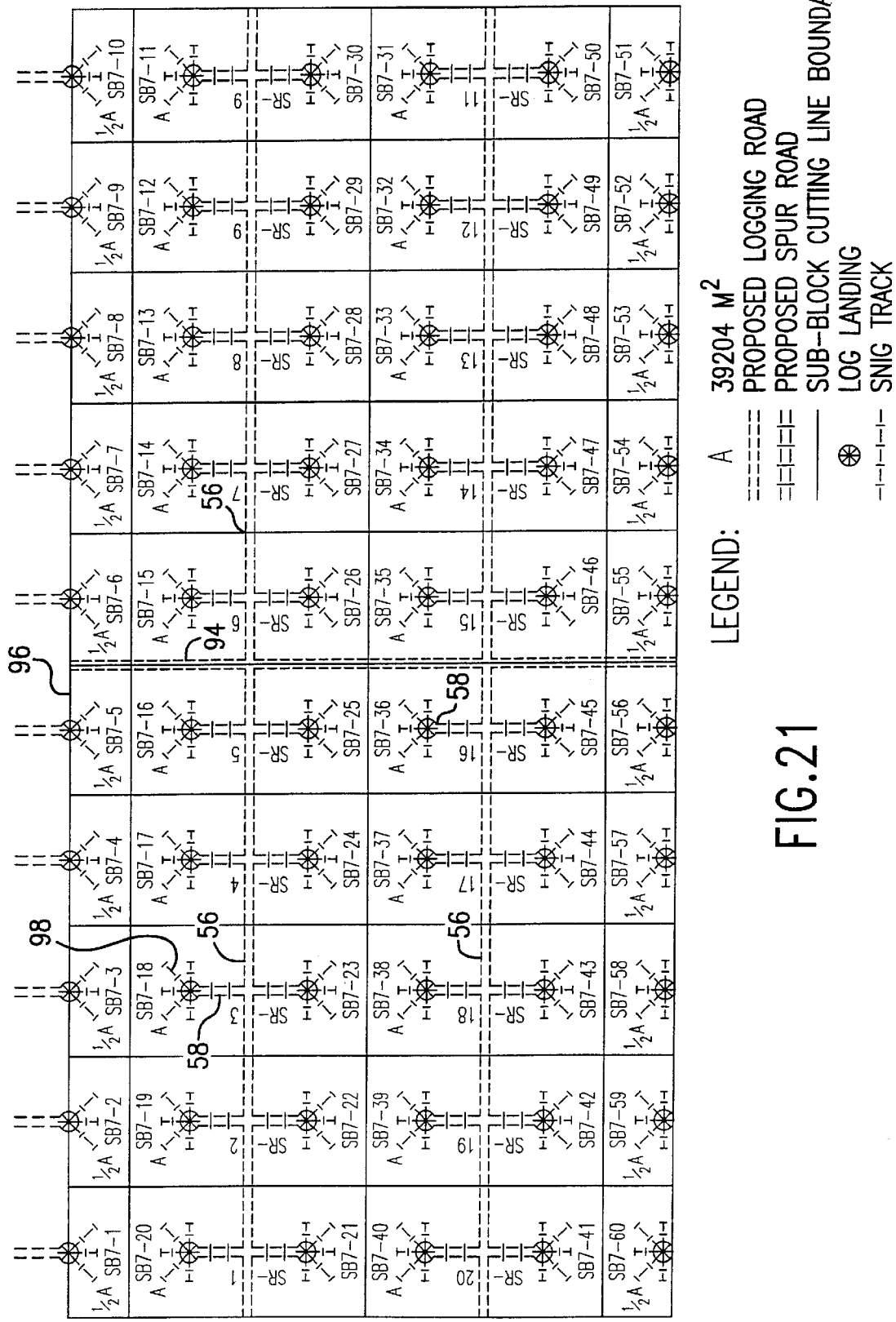
FIG. 21 is a top plan view of a road track pattern for a crane in a block of a logging area.

Referring to FIG. 21, a layout of the road network of a block of about 510 acres of virgin jungle for the first embodiment of the invention is shown. The large block is demarcated by means of smaller imaginary square sub-blocks of 10 acres each. A main road 94 is laid across the mid-way of the large block 96. The timber trees along this proposed main road 94 are harvested according to the method described hereinabove, or as known in the art. The width of the main road is substantially 7.32 meters. From the main road 94 a pair of parallel logging roads 56 are constructed dividing the large block into six blocks. Each of these blocks is further subdivided into a square block of 10 acres.

Figure 22:
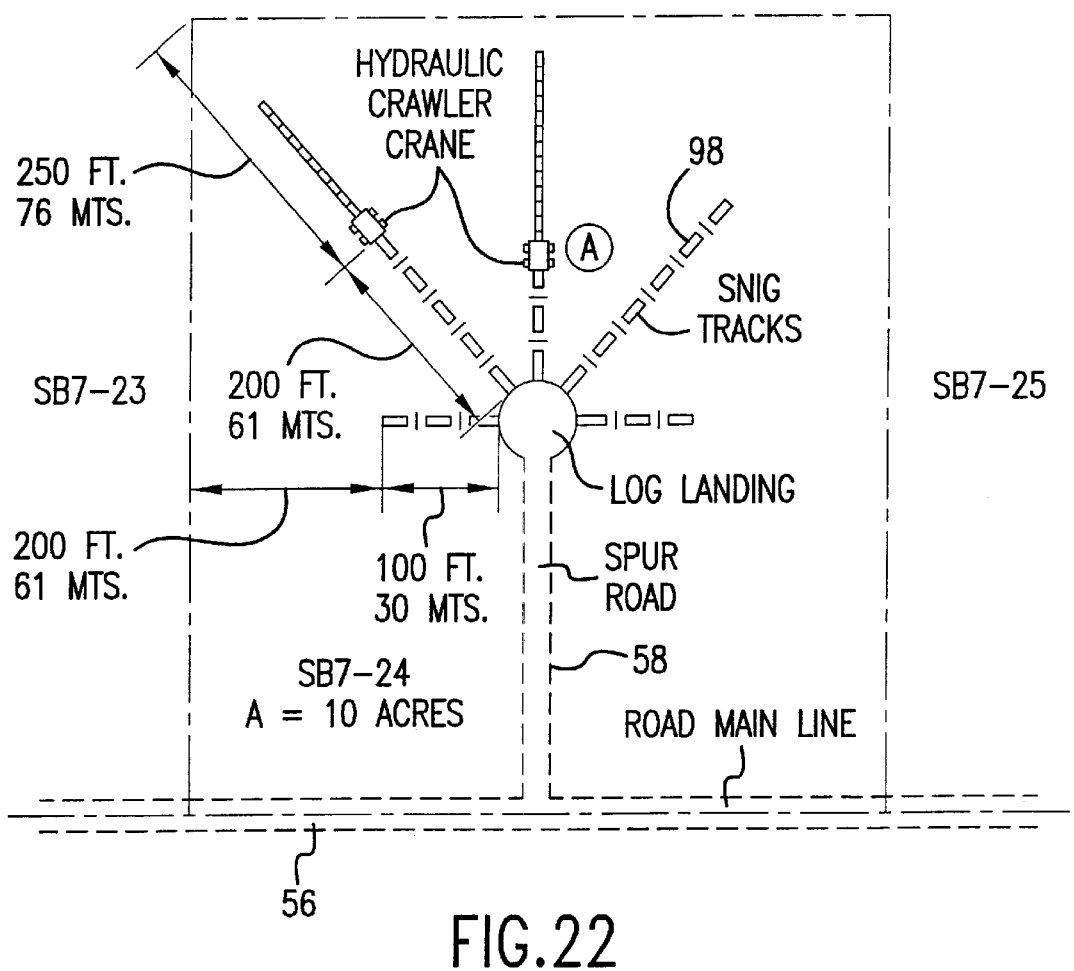
FIG. 22 is a top plan view of a first path of the crane moving within a sub-block in the logging area.
Figure 23:
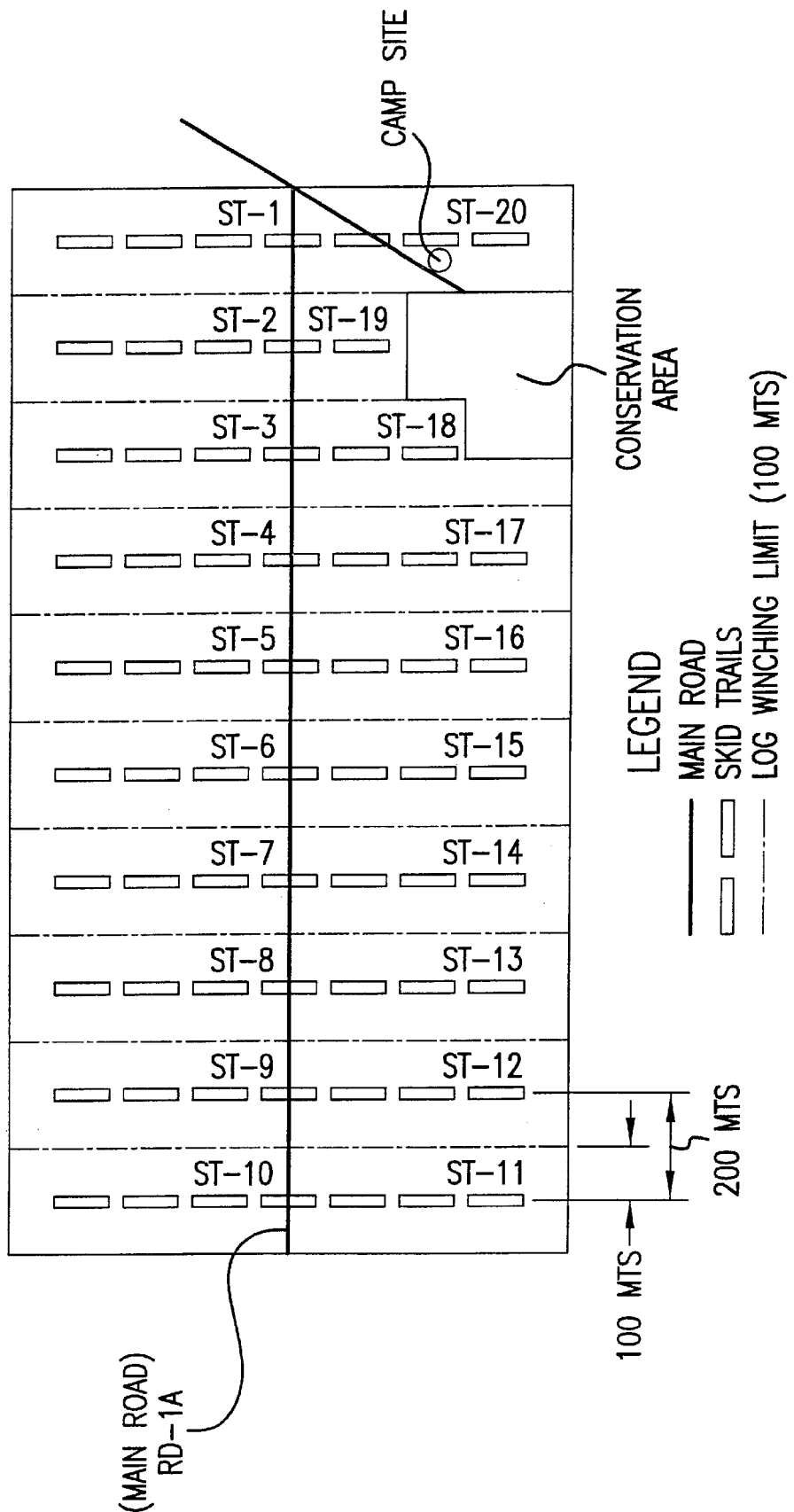
FIG. 23 is a top plan view of a second path of the crane moving within a sub-block in a logging area.
Figure 24:
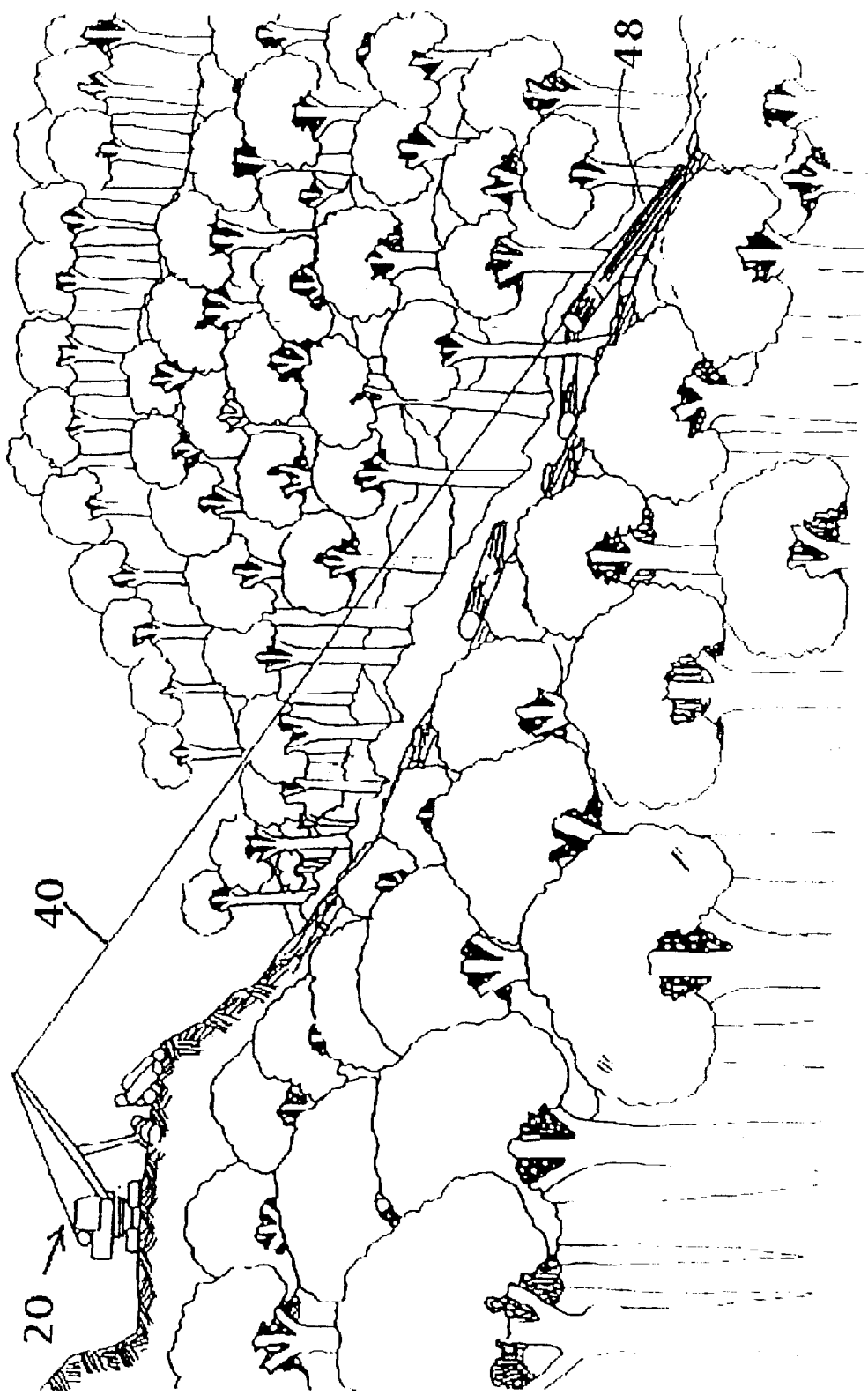
FIG. 24 shows the snigging of cut timber trees on a sloped terrain.

In each sub-block a spur road 58 is cut across the block at a right angle to the logging road 56. The spur road 58 is cut to terminate at the mid-point of the sub-block. The mid-point region of each sub-block serves as a log-landing yard. From the log landing yard a plurality of radially extending snig tracks 98 are constructed. Where the crane boom 14 is 61 meters, 200 feet, in length, the snig tracks 98 can extend from about 61 to 76 meters, 200 feet to 250 feet, of the border of the sub-block of the logging area (FIG. 22). Thus by this layout of the spur main road, spur road and snig tracks, it is possible for the crane boom, if necessary, and with the further use of connector sling cables 100, to reach every tree within harvesting sub-block. The total area damaged by the use of this method of harvesting is below 10% as compared to more than 60% in prior art methods. Table 1 below shows the usage of the area in a block of 510 acres utilizing the above described pattern.

TABLE 1

Roads and Snig Tracks Design Block 7

Area: 1,999,200 m² (510.00 acres)

| | Length M (Chain) | Width M (Ft) | Area M² (Acres) |
|---|---|---|---|
| Road | | | |
| Rd 1 | 1009.8 (51) | 7.2 (24) | 7270.56 (1.856) |
| Rd 1-1 | 891 (45) | 7.2 (24) | 6415.20 (1.637) |
| Rd 1-2 | 910.8 (46) | 7.2 (24) | 6557.76 (1.674) |
| Rd 1-3 | 910.8 (46) | 7.2 (24) | 6557.76 (1.674) |
| Rd 14 | 891 (45) | 7.2 (24) | 6415.20 (1.637) |
| Spur Roads | | | |
| Sr-1 | 198 (10) | 7.2 (24) | 1425.6 (0.364) |
| Sr-2 | 198 (10) | 7.2 (24) | 1425.6 (0.364) |
| Sr-3 | 198 (10) | 7.2 (24) | 1425.6 (0.364) |
| Sr-4 | 198 (10) | 7.2 (24) | 1425.6 (0.364) |
| Sr-5 | 198 (10) | 7.2 (24) | 1425.6 (0.364) |
| Sr-6 | 198 (10) | 7.2 (24) | 1425.6 (0.364) |
| Sr-7 | 198 (10) | 7.2 (24) | 1425.6 (0.364) |
| Sr-8 | 198 (10) | 7.2 (24) | 1425.6 (0.364) |
| Sr-9 | 198 (10) | 7.2 (24) | 1425.6 (0.364) |
| Sr-10 | 198 (10) | 7.2 (24) | 1425.6 (0.364) |
| Sr-11 | 198 (10) | 7.2 (24) | 1425.6 (0.364) |

TABLE 1-continued

Roads and Snig Tracks Design Block 7

Area: 1,999,200 m² (510.00 acres)

| | Length M (Chain) | Width M (Ft) | Area M² (Acres) |
|---|---|---|---|
| Sr-12 | 198 (10) | 7.2 (24) | 1425.6 (0.364) |
| Sr-13 | 198 (10) | 7.2 (24) | 1425.6 (0.364) |
| Sr-14 | 198 (10) | 7.2 (24) | 1425.6 (0.364) |
| Sr-15 | 198 (10) | 7.2 (24) | 1425.6 (0.364) |
| Sr-16 | 198 (10) | 7.2 (24) | 1425.6 (0.364) |
| Sr-17 | 198 (10) | 7.2 (24) | 1425.6 (0.364) |
| Sr-18 | 198 (10) | 7.2 (24) | 1425.6 (0.364) |
| Sr-19 | 198 (10) | 7.2 (24) | 1425.6 (0.364) |
| Sr-20 | 198 (10) | 7.2 (24) | 1425.6 (0.364) |
| Log Landings | | | |
| 60 Landings (Area 1920.99 m² (0.49 Acres) per landing) | | | 115259.76 (29.400) |
| Grand Total | 8573.4 m (433 Chains) | | 176,988.24 m² (45.158 Acres) |
| Percentage = 8.85% | | | |

After the tree harvesting in one sub-block is complete, the crawler crane moves to the adjoining sub-block, Where the harvesting process is repeated. Conventional transport lorries remove the harvested logs from the logging yard.

Another layout pattern of the main road 94 and the snig tracks 98 is shown in FIG. 16. It will be seen that the snig tracks 98 are laid parallel to each other and extend from the main road 94. The distance between two adjacent snig tracks 98 is substantially 182 meters, or 600 feet. By adopting this layout configuration of the main road 94 and the snig tracks 98 it is possible for the crawler crane with a 50 meter, 165 foot, boom to reach every tree between two adjacent snig tracks 98. Table 2 shows the usage area in a block of 216.74 hectares.

TABLE 2

Roads and Snig Tracks Design Block No. 42

Area: 2099687.8 m² (535.58 acres)

| | Length M (Chain) | Width M (Ft) | Area M²(Acres) |
|---|---|---|---|
| Road | | | |
| Rd A | 1207.8 (61) | 7.2 (24) | 8696.16 (2.220) |
| Rd B | 1643.4 (83) | 7.2 (24) | 11832.48 (3.020) |
| Rd C | 415.8 (21) | 7.2 (24) | 2993.76 (0.764) |
| Snig Tracks | | | |
| ST-1 | 336.6 (17) | 7.2 (24) | 2423.52 (0.619) |
| ST-2 | 237.6 (12) | 7.2 (24) | 1710.72 (0.437) |
| ST-3 | 138.6 (7) | 7.2 (24) | 997.92 (0.255) |
| ST-4 | 1207.8 (61) | 7.2 (24) | 8696.16 (2.220) |
| ST-5 | 1366.2 (69) | 7.2 (24) | 9836.64 (2.511) |
| ST-6 | 1386 (70) | 7.2 (24) | 9979.2 (2.547) |
| ST-7 | 1306.8 (66) | 7.2 (24) | 9468.96 (2.402) |
| ST-8 | 1227.6 (62) | 7.2 (24) | 8838.72 (2.256) |
| ST-9 | 1148.4 (58) | 7.2 (24) | 8268.48 (2.110) |
| ST-10 | 1069.2 (54) | 7.2 (24) | 7698.24 (1.965) |
| ST-11 | 990 (50) | 7.2 (24) | 7128 (1.819) |
| ST-12 | 574.2 (29) | 7.2 (24) | 4134.24 (1.055) |
| ST-13 | 831.6 (42) | 7.2 (24) | 5987.52 (1.528) |
| ST-14 | 732.6 (37) | 7.2 (24) | 5274.72 (1.346) |
| ST-15 | 653.4 (33) | 7.2 (24) | 4704.48 (1.201) |
| ST-16 | 475.2 (24) | 7.2 (24) | 3420 (0.873) |

TABLE 2-continued

Roads and Snig Tracks Design
Block No. 42

Area: 2099687.8 m² (535.58 acres)

| | Length<br>M (Chain) | Width<br>M (Ft) | Area<br>M²(Acres) |
|---|---|---|---|
| ST-17 | 277.2 (14) | 7.2 (24) | 1995.84 (0.509) |
| Total | 17,226 m<br>(870 Chains) | | 121845.76 m²<br>(31.657 Acres) |
| Percentage = 0.059% | | | |

Referring now to the second, third and fourth embodiments, the anticipated amount of forest damage due to the construction of the main roads 66 and the skid trails 68 utilizing the modified hydraulic excavator in an actual study is tabulated below. A block 102 of the forest is used to compute the damages. The block includes, a main road 66 and ten skid trails 68 on either side of the main road. The total area of the main road 66 and the skid trails 68 constructed is 5.095 hectares out of a total block area of 203.20 hectares, giving a percentage of 2.5% of destroyed area.

The area of damage caused by the snigging of harvested timber 70 is estimated by multiplying a factor of 0.0078 hectares for every log corridor during the winching. If a total of 3,510 trees are winched, a total area of 24.696 hectares is damaged, giving a percentage of 12.15% out of the area of block 102 of 203.20 hectares. The total area damaged due to harvesting of timber is therefore 29.095 hectares out of the block of 203.20 hectares, comprising 14.66% of the area harvested.

MAIN ROAD AND SKID TRAILS
(COMPARTMENT NO. 41)
AREA : 203.20 Hectares (HAS)

| | LENGTH<br>(M) | WIDTH<br>(M) | AREA<br>(HAS) |
|---|---|---|---|
| A. ROAD NO. 1A | 1,940 | 7.32 | 1.420 |
| B. 20 SKID TRAILS | 7,530 | 4.88 | 3.675 |
| TOTAL | 9,470 | | 5.095 |

LOG WINCHING

Using the factor of 0.00784Ha for every timber corridor during winching, therefore, the factor multiplied by the number of trees to be cut.

EXAMPLE:
3,150 TREES×0.00784=24.696 HAS
PERCENTAGE OF LOG WINCHING=12.15%
TOTAL AREA FOR FOREST DAMAGES=29.791 HAS
TOTAL PERCENTAGE OF FOREST DAMAGES= 14.66%

It is possible to envisage other layout patterns of roads and snig tracks/skid trails to achieve the same result of less than 10% damage for the first embodiment of the method of this invention, and less than 15% damage for the second, third and fourth embodiments of the invention to the ground in the logging area.

To facilitate proper and adequate communications between the various categories of forestry operators, it is preferable that a reliable wireless telecommunication facility be provided. For example portable two-way radios with ear phones can be provided.

It will be appreciated that the roads and the tracks are constructed following a pre-planned pattern layout to keep the damage to the earth as minimum as possible. This is achieved by the construction using minimum length/area of jungle road/main road, snig tracks 98/skid trails 68, and spur roads 58, as contrasted to the prior art methods, in which about 60% of the jungle cover is destroyed.

Although several embodiments of the invention have been described in detail, the disclosed embodiments are intended as illustrative only since numerous modifications and variations therein will be apparent to those skilled in the art. It is thus understood that the invention is not limited to the specific embodiments disclosed herein, and that many modifications and other embodiments of the invention are intended to be included within the scope of the appended claims. Moreover, although specific terms are employed herein, as well as in the claims, they are used in the generic and descriptive sense only, and not for the purposes of limiting the described invention, nor the claims which follow.

I claim:

1. A forest harvesting machine for use in harvesting standing trees, said machine comprising:
   a crawler;
   an elongate boom having a first end and a spaced second end, the first end of the boom being mounted on the crawler, the boom being enveloped by a plurality of metal plate sidings;
   said boom being constructed and arranged to be rotated through a 360 degree horizontal circle about the crawler, and moved vertically at an angle of up to up 90 degrees with respect to the crawler;
   a stabilizer member pivotally mounted to the boom intermediate the ends thereof, the stabilizer member comprising a backhoe arm; and
   an operator cabin mounted on the crawler, said cabin having a metal cage extending at least partially thereabout.

2. The forest harvesting machine of claim 1, further comprising a winch assembly mounted on the crawler.

3. The forest harvesting machine of claim 2, he stabilizer member further comprising a foldable arm structure, the arm structure including a pair of grasping claws at an end of the stabilizer member spaced from the boom.

4. The forest harvesting machine of claim 3, wherein the stabilizer member is used to stabilize the crawler during the operation of the machine.

5. The forest harvesting machine of claim 1, further comprising a roller guide means secured to the second end of the boom.

6. A forest harvesting machine comprising:
   a crawler;
   an elongate boom having a first end and a spaced second end, the first end of the boom being pivotally affixed to the crawler;
   a roller mounted at the second end of the boom;
   a cable winch carried on the crawler;

an elongate cable carried on the cable winch and having a first cable end affixed to the winch, the cable being passed from the cable winch and at least partially about said roller;

an elongate arm having a first end and a spaced second end, the first end of said arm being pivotally affixed to said boom intermediate the first and second ends thereof, respectively; and a gripper assembly pivotally affixed to the second end of said arm.

7. The forest harvesting machine of claim 6, said arm further comprising a foldable arm structure constructed and arranged to be pivoted intermediate the ends thereof.

8. The forest harvesting machine of claim 7, said arm further comprising a backhoe arm.

9. The forest harvesting machine of claim 7, said arm being constructed and arranged to stabilize the crawler during use of the machine.

10. The forest harvesting machine of claim 6, said gripper assembly further comprising a pair of opposed grasping claws.

11. The forest harvesting machine of claim 6, further comprising a snigging fixture connected to a second cable end.

12. The forest harvesting machine of claim 11, said snigging fixture comprising a sledge.

13. A forest harvesting machine comprising:

a crawler frame;

a rotatable carriage mounted on and carried by said frame;

an elongate boom having a first end and a spaced second end, the first end of the boom being pivotally affixed to said carriage;

said boom being formed of a first pair of elongate and opposed planar side surfaces and a second pair of elongate and opposed planar side surfaces, the respective side surfaces being joined to one another along their common side edges;

the respective side surfaces of said boom being enclosed for substantially the entire length of said boom intermediate the first and second ends thereof;

a roller mounted at the second end of the boom;

a cable winch carried on the crawler and-having a continuous cable thereon, said cable having a first cable end affixed to the winch, the cable being passed from the cable winch and at least partially about said roller; and a stabilizer member mounted to said boom intermediate the ends thereof, the stabilizer member comprising a backhoe arm.

14. The forest harvesting machine of claim 13, said rotatable carriage being constructed and arranged to rotate the boom through a 360 degree horizontal circle about the crawler, the boom being constructed and arranged to be moved vertically at an angle of up to up 90 degrees with respect to said carriage.

15. The forest harvesting machine of claim 13, further comprising a gripper assembly mounted to an end of the backhoe arm spaced from said boom.

16. The forest harvesting machine of claim 15, said gripper assembly further comprising a pair of opposed grasping claws.

17. The forest harvesting machine of claim 13, further comprising an operator cabin mounted on said carriage, said cabin being at least partially enclosed by a metal cage.

* * * * *